US012450712B2

(12) United States Patent
Suzuki

(10) Patent No.: US 12,450,712 B2
(45) Date of Patent: Oct. 21, 2025

(54) INSPECTION DEVICE AND MOLDED-PRODUCT PROCESSING SYSTEM

(71) Applicant: KIKUSUI SEISAKUSHO LTD., Kyoto (JP)

(72) Inventor: Hiroshi Suzuki, Kyoto (JP)

(73) Assignee: KIKUSUI SEISAKUSHO LTD., kyoto (JP)

( * ) Notice: Subject to any disclaimer, the term of this patent is extended or adjusted under 35 U.S.C. 154(b) by 379 days.

(21) Appl. No.: 18/102,199

(22) Filed: Jan. 27, 2023

(65) Prior Publication Data

US 2023/0281780 A1 Sep. 7, 2023

(30) Foreign Application Priority Data

Mar. 4, 2022 (JP) ................. 2022-033757

(51) Int. Cl.
  *G06T 7/90* (2017.01)
  *B29C 43/02* (2006.01)
  *B29C 43/58* (2006.01)
  *G06T 7/00* (2017.01)

(52) U.S. Cl.
  CPC ............ *G06T 7/0004* (2013.01); *B29C 43/02* (2013.01); *B29C 43/58* (2013.01); *G06T 7/90* (2017.01); *B29C 2043/585* (2013.01); *B29C 2043/5891* (2013.01)

(58) Field of Classification Search
  CPC .... G06T 7/0004; G06T 7/90; B29C 2043/585
  USPC ........................................ 382/141
  See application file for complete search history.

(56) References Cited

U.S. PATENT DOCUMENTS

| 8,055,055 | B2 | 11/2011 | Hamada et al. |
| 9,102,108 | B2 | 8/2015 | Tucker et al. |
| 10,011,057 | B2 | 7/2018 | Sato |
| 11,681,216 | B2 | 6/2023 | Terao |
| 2006/0251316 | A1* | 11/2006 | Tucker ............... B29D 11/0098 382/141 |
| 2009/0034829 | A1 | 2/2009 | Hamada et al. |
| 2017/0043511 | A1 | 2/2017 | Sato |
| 2019/0061207 | A1 | 2/2019 | Terao |
| 2019/0105863 | A1* | 4/2019 | Shimada ............... B30B 15/302 |

FOREIGN PATENT DOCUMENTS

| JP | S60-247143 A | 12/1985 |
| JP | S 62-14775 B2 | 4/1987 |
| JP | H08-27841 B2 | 3/1996 |
| JP | 2005-326246 A | 11/2005 |

(Continued)

*Primary Examiner* — Jamares Q Washington
(74) *Attorney, Agent, or Firm* — McGinn I.P.Law Group, PLLC

(57) ABSTRACT

An exterior inspection device configured to inspect whether or not a molded product in a predetermined shape has defectiveness based on an image of the molded product, the inspection device including: a first foreign matter determiner configured to determine whether or not, in an obtained image of the molded product, a first inspection region located inside an outline of an assumed normal molded product P includes foreign matter; and a second foreign matter determiner configured to determine whether or not, in the obtained image of the molded product, a second inspection region located outside the outline of the assumed normal molded product includes foreign matter.

20 Claims, 20 Drawing Sheets

(56) References Cited

FOREIGN PATENT DOCUMENTS

| | | |
|---|---|---|
| JP | 5033077 B2 | 9/2012 |
| JP | 2017-038042 A | 2/2017 |
| JP | 2019-135058 A | 8/2019 |
| JP | 2019-155422 A | 9/2019 |

* cited by examiner

INSPECTION DEVICE AND MOLDED-PRODUCT PROCESSING SYSTEM

BACKGROUND

Typically, a compression-molding machine has been used to compress a powdery material to obtain a molded product, which is transferred by a molded-product processing system (e.g., see JP 2019-135058 A).

Such a molded-product processing system typically includes an exterior inspection device configured to detect foreign matter, black spots, color irregularity, and the like on a surface portion of the molded product. The exterior inspection device has conventionally inspected only a region inside by at least a predetermined distance from an outer edge of the molded product. Such a limited region is inspected in order to avoid erroneous determination as foreign matter, for any minute missing portion or the like occurred at an edge portion of the molded product.

However, such an inspection as described above (i.e., only in the region inside by at least a predetermined distance from an outer edge of the molded product) fails to detect foreign matter projecting from a side surface of the molded product.

SUMMARY OF THE INVENTION

An exemplary object of the present invention is to provide an inspection device configured to detect even foreign matter projecting from a side surface of a molded product.

The exemplary invention provides an inspection device configured to inspect a molded product whether or not the molded product molded into a predetermined shape has defectiveness based on a captured image of the molded product, the inspection device including: a first foreign matter determiner configured to determine whether or not, in an obtained image of the molded product, a first inspection region located inside an outline of an assumed normal molded product includes foreign matter; and a second foreign matter determiner configured to determine whether or not, in the obtained image of the molded product, a second inspection region located outside the outline of the assumed normal molded product includes foreign matter.

The "foreign matter" according to the exemplary invention conceptually includes not only an object other than a powdery material or the like forming an ingredient of the molded product, but also a black spot, color irregularity, and the like, Such a configuration achieves determination of whether or not there is foreign matter in an image of the first inspection region as well as in an image of the second inspection region, to enable detection of even foreign matter projecting from a side surface of the molded product particularly based on the image of the second inspection region.

Particularly, in a case where the second foreign matter determiner determines that the foreign matter exists if a portion in a color different from a color of a background occupies at least a predetermined ratio in the second inspection region, presence of the foreign matter can be determined without use of any other sensor or the like.

The "background" according to the exemplary invention conceptually includes a portion outside the molded product in the captured image of the molded product.

Examples of a configuration facilitating detection of the foreign matter in a bright color such as white include an inspection device constituted by a camera configured to obtain an image of the molded product and a light source disposed on a side where the camera is disposed with respect to the molded product, in which the background of the second inspection region has black or a color similar to black.

The "black or a color similar to black" conceptually includes, assuming that black has a pixel value (R, G, B)=(0, 0, 0) and white has a pixel value (R, G, B)=(255, 255, 255), a color having a pixel value including R, G, and B values equal to or less than a predetermined threshold (e.g. 15).

Examples of a configuration facilitating detection of the foreign matter in a dark color such as black include an inspection device constituted by a camera configured to obtain an image of the molded product and a light source disposed on a side opposite to a side where the camera is disposed with respect to the molded product, and an inspection device in which the background of the second inspection region has white or a color similar to white.

The "white or a color similar to white" conceptually includes, assuming that black has the pixel value (R, G, B)=(0, 0, 0) and white has the pixel value (R, G, B)=(255, 255, 255), a color having a pixel value including R, G, and B values equal to or more than a predetermined threshold (e.g. 240).

Examples of a system that is capable of suitably using the inspection device thus configured include a molded-product processing system connected to a compression-molding machine configured to compress a powdery material to mold the powdery material into the predetermined shape and including the inspection device configured to inspect molded products molded by the compression-molding machine.

A powdery material is an aggregate of minute solids and conceptually includes an aggregate of particles such as so-called granules and an aggregate of powder smaller than such particles. Specific examples of the powdery material include a powdery material containing a principal agent, an excipient, a binder, a disintegrant, a stabilizer, and a preservative. The powdery material according to the exemplary invention also includes a mixture of two or more types of powdery materials, and a powdery material containing the principal agent mixed with a lubricant such as magnesium stearate.

More preferred examples of the molded-product processing system include the molded-product processing system including a module that is coupled to the compression-molding machine, is configured to convey the molded products being kept aligned in an order of molding by the compression-molding machine, and includes the inspection device.

The exemplary invention successfully provides an inspection device configured to detect even foreign matter projecting from a side surface of a molded product.

BRIEF DESCRIPTION OF THE DRAWINGS

The exemplary aspects of the invention will be better understood from the following detailed description of the exemplary embodiments of the invention with reference to the drawings:

FIG. 119 is another longitudinal sectional view of the compression-molding machine, the discharge device, and the conveying device according to the exemplary embodiment;

DETAILED DESCRIPTION OF AN EXEMPLARY EMBODIMENT

Figure 1:
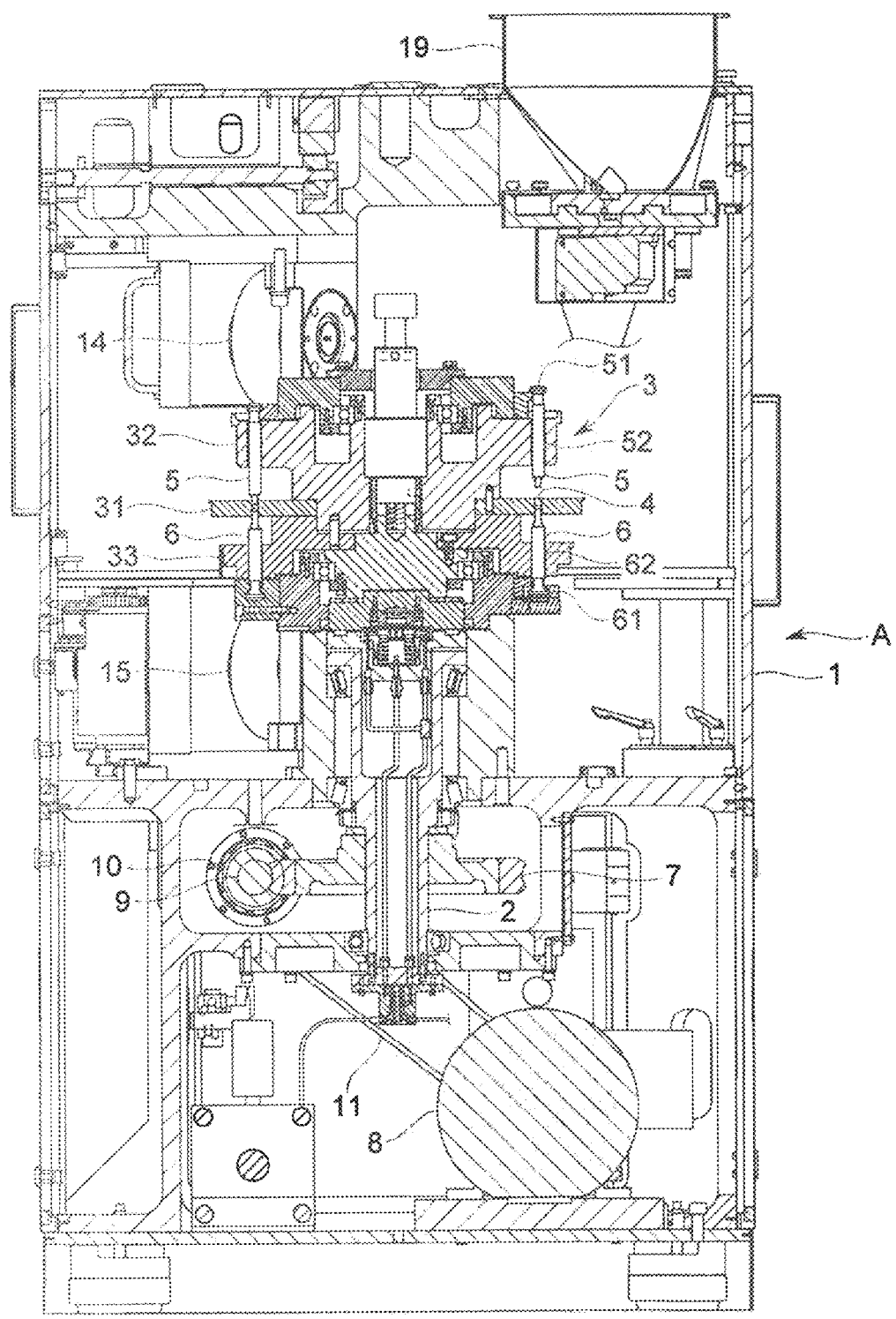
FIG. 1 is a longitudinal sectional view of a rotary compression-molding machine according to an exemplary embodiment of the exemplary invention.

An exemplary embodiment of the invention will now be described with reference to the drawings. Initially described is an overview of an entire rotary compression-molding machine (hereinafter, referred to as the "molding machine") A according to the exemplary embodiment. The molding machine A is configured to compress a powdery material to obtain a compression-molded product P such as a pharmaceutical tablet. As shown exemplarily in FIG. 1, the molding machine A includes a frame 1 accommodating an upright shaft 2 functioning as a rotary shaft and a turret 3 attached to a connection portion that is disposed at a top of the upright shaft 2.

The turret 3 horizontally rotates about the upright shaft 2, and more specifically, spins thereabout. The turret 3 includes a die table (e.g., a die disc) 31, an upper punch-retaining portion 32, and a lower punch-retaining portion 33. As shown exemplarily in FIG. 2, the die table 31 has a substantially circular disc shape in a planar view as viewed from a direction of a rotary' axis of the turret 3 (i.e., in a vertical direction). Furthermore, the die table 31 has a plurality of die bores 4 disposed in an outer circumferential portion so as to be aligned in a rotation direction (i.e., a circumferential direction) at predetermined intervals. Each of the die bores 4 vertically penetrates the die table 31. The die table 31 is alternatively divided into a plurality of plates. Instead of forming the die bores 4 by directly drilling into the die table 31, the die table 31 is alternatively provided with a plurality of die members that is separate from the die table 31 and is detachably attached thereto. In this case, each of the die members has a die bore penetrating vertically.

The die bores 4 each have an upper punch 5 and a lower punch 6 disposed above and below the die bore 4, respectively. As shown exemplarily in FIG. 3, the upper punches 5 and the lower punches 6 are retained by the upper punch-retaining portion 32 and the lower punch-retaining portion 33, respectively, so as to be independently slidable vertically with respect to a corresponding one of the die bores 4. The upper punches 5 each have a tip 53 that enters and exits the corresponding one of the die bores 4. As further shown exemplarily in FIG. 3, the lower punches 6 each have a tip 63 that is kept inserted in the corresponding one of the die bores 4. The upper punches 5 and the lower punches 6 horizontally rotate, and more specifically revolve, about the upright shaft 2 along with the turret 3 and the die bores 4.

The upright shaft 2 has a lower end to which a worm wheel 7 is attached. The worm wheel 7 meshes with a worm gear 10. The worm gear 10 is fixed to a gear shaft 9 that is driven by a motor 8. Drive power outputted from the motor 8 is transmitted to the gear shaft 9 via a belt 11, so as to drive and to rotate the upright shaft 2 by the worm gear 10 and the worm wheel 7, and further to rotate the turret 3 and the punches 5 and 6.

Figure 2:
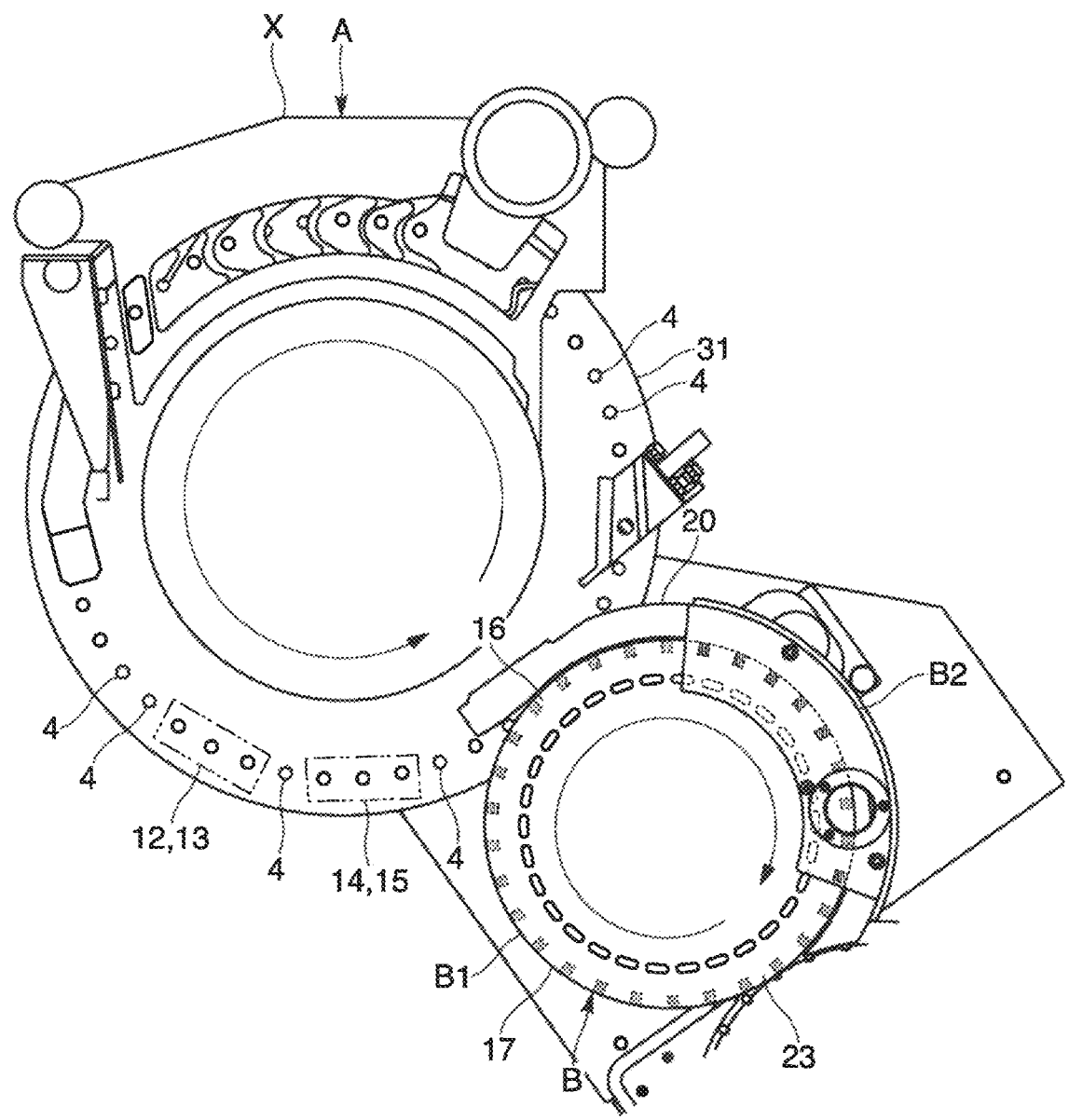
FIG. 2 is a plan view of main parts of the compression-molding machine and a discharge device according to the exemplary embodiment.

The powdery material as a constituent material for molded products P is filled in the die bores 4 with use of a feeder X, as shown exemplarily in FIG. 2. Examples of the feeder X include an agitated feeder and a gravity feeder, either one of which is applicable to the exemplary invention. The powdery material is fed to the feeder X with use of a powdery material feeding device. The powdery material is fed to the powdery material feeding device with use of a hopper 19. The hopper 19 is detachably attached to the molding machine A.

Figure 3:
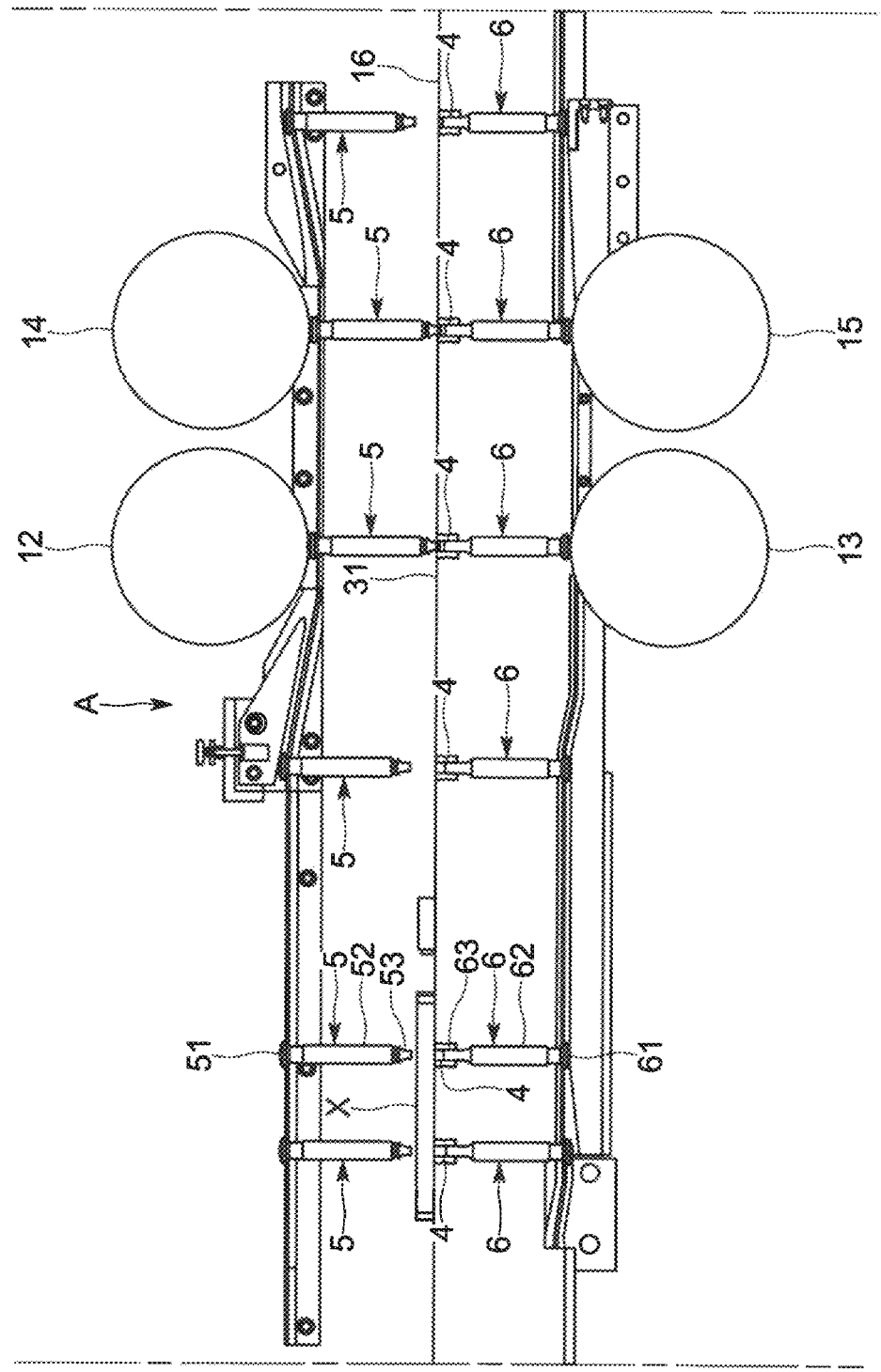
FIG. 3 is a cylindrical view of the compression-molding machine according to the exemplary embodiment.

As shown exemplarily in FIGS. 2 and 3, a preliminary compression upper roll 12, a preliminary compression lower roll 13, a substantial compression upper roll 14, and a substantial compression lower roll 15 are disposed on orbits of the punches 5 and 6 that revolve about the upright shaft 2. The preliminary compression upper roll 12 and the preliminary compression lower roll 13 are paired to vertically sandwich the punches 5 and 6, and the substantial compression upper roll 14 and the substantial compression lower roll 15 are paired to vertically sandwich the punches 5 and 6, respectively. The preliminary compression upper roll 12 and the preliminary compression lower roll 13 as well as the substantial compression upper roll 14 and the substantial compression lower roll 15 bias the upper and lower punches 5 and 6 to bring the upper and lower punches 5 and 6 closer to each other, so that the tips 53 and 63 compress from above and below the powdery material filled in the die bores 4.

The upper and lower punches 5 and 6 have the heads 51 and 61, respectively, pressed by the rolls 12, 13, 14, and 15, and the trunks 52 and 62 are smaller in diameter than the heads 51 and 61. The upper punch-retaining portion 32 (e.g., shown in FIG. 1) of the turret 3 vertically slidably retains the trunks 52 of the upper punches 5, whereas the lower punch-retaining portion 33 vertically slidably retains the trunks 62 of the lower punches 6. The tips 53 and 63 as distal ends of the trunks 52 and 62 are thinner than the remaining parts and have diameters substantially equal to an inner diameter of the die bores 4 so as to be inserted to the die bores 4. The punches 5 and 6 revolve to cause the rolls 12, 13, 14, and 15 to come closer to the heads 51 and 61 of the punches 5 and 6, respectively. The rolls 12, 13, 14, and 15 come into contact with the heads 51 and 61 to step thereonto. The rolls 12, 13, 14, and 15 further press the upper punches 5 downward and press the lower punches 6 upward. While the rolls 12, 13, 14, and 15 are in contact with flat surfaces of the punches 5 and 6, the punches 5 and 6 keep applying constant pressure to the powdery material in the corresponding die bores 4.

There is a delivery position 16 for the molded products P, displaced ahead, in a rotation direction of the turret 3 and the punches 5 and 6, from a position pressed by the substantial compression upper roll 14 and the substantial compression lower roll 15. Each of the lower punches 6 ascends until an upper end surface of the tip 63 of the lower punch 6 becomes substantially flush with an upper end of the die bore 4, or an upper surface of the die table 31 before reaching the delivery position 16, and pushes the molded product P out of the die bore 4. The molded product P pushed out of the die bore 4 is transferred to a molded-product processing system (hereinafter, referred to as the "processing system") S connected to the molding machine A at the delivery position 16.

The molding machine A and (modules B, C, and D of) the processing system S according to the exemplary embodiment are controlled by a controller examples of which may include a microcomputer system, a personal computer, and a work station each including a processor, a main memory and an auxiliary storage device (e.g. a flash memory or a hard disk drive) as storage devices, an input/output interface, and the like, and a programmable controller. The controller reads a program preliminarily stored in the auxiliary storage device to the processor via the memory, causes the processor to decode the program, and controls the molding machine A and the processing system S.

As shown exemplarily in FIGS. 2, 4, 8, and 12, the processing system S accompanying the molding machine A in the exemplary embodiment includes the plurality of disposed modules B, C, and D each configured to apply a certain post process to the molded products P.

The module B located downstream of and directly connected to the molding machine A includes a discharge device B1 configured to sequentially discharge the molded products P from the molding machine A such that the molded products P are kept aligned in the order of molding by the molding machine A. The discharge device B1 is configured to discharge the molded products P at the delivery position 16 and convey the molded products P toward a processing device B2 configured to apply a subsequent process to the molded products P. As shown exemplarily in FIGS. 2 and 4 to 7, the discharge device 91 includes, as main constituent elements, a rotator 17 serving as a transfer body configured to horizontally rotate about a vertical axis in synchronization with the turret 3 and the die table 31 of the molding machine A, a retainer 18 disposed vertically below the rotator 17 and facing the rotator 17, a plurality of projections 171 projecting downward toward the retainer 18 from a lower surface facing the retainer 18 in an outer circumferential portion of the rotator 17, an outer guide 20 disposed adjacent to the outer circumferential portion of the rotator 17 and closing, from outside, gaps between the adjacent projections 171, and an inner guide 21 disposed inward from the outer circumferential portion of the rotator 17 and closing, from inside, the gaps between the adjacent projections 171.

The rotator 17 rotates clockwise in the figures relatively to the die table 31 that rotates counterclockwise in the figures. In order to synchronize a rotation between the die table 31 and the rotator 17, the rotator 17 is rotated by a motor 400 configured as a servo motor or a stepping motor, and angular position sensors, such as rotary encoders detect a rotation angle and a rotational speed of each of the turret 3 and the rotator 17, to enable a feedback control of a rotational speed of the motor 400 for a synchronized rotation between the turret 3 and the rotator 17. The turret 3 and the rotator 17 are alternatively mechanically connected to interlock via a gear transmission mechanism, a winding transmission mechanism, or the like.

The rotator 17 has a substantially circular disc shape in a planar view as viewed from a direction of a rotary axis 43 of the rotator 17 (i.e., in the vertical direction). The plurality of projections 171 at the rotator 17 is disposed along an outer circumferential edge of the rotator 17 circumferentially around the rotary'axis 43 of the rotator 17, to be spaced apart from each other at predetermined intervals. These projections 171 obviously rotate integrally with the rotator 17. The molded products P by the molding machine A are each captured between the adjacent projections 171 of the rotator 17 to be transferred while being accommodated in the gap between the adjacent projections 171.

The gaps between the projections 171 circumferentially adjacent to each other have a width W larger than the largest external size of the molded product P by the molding machine A. The largest external size corresponds to the longest one of line segments in a planar view, each extending from a certain point on an outer edge (i.e., outline) of the molded product P to a different point on the outer edge of the molded product P through a gravity center or a geometrical center of the molded product P. In a case where the molded product P has an elliptical shape in a planar view, the largest external size corresponds to a major axis or a long diameter.

Figure 5:
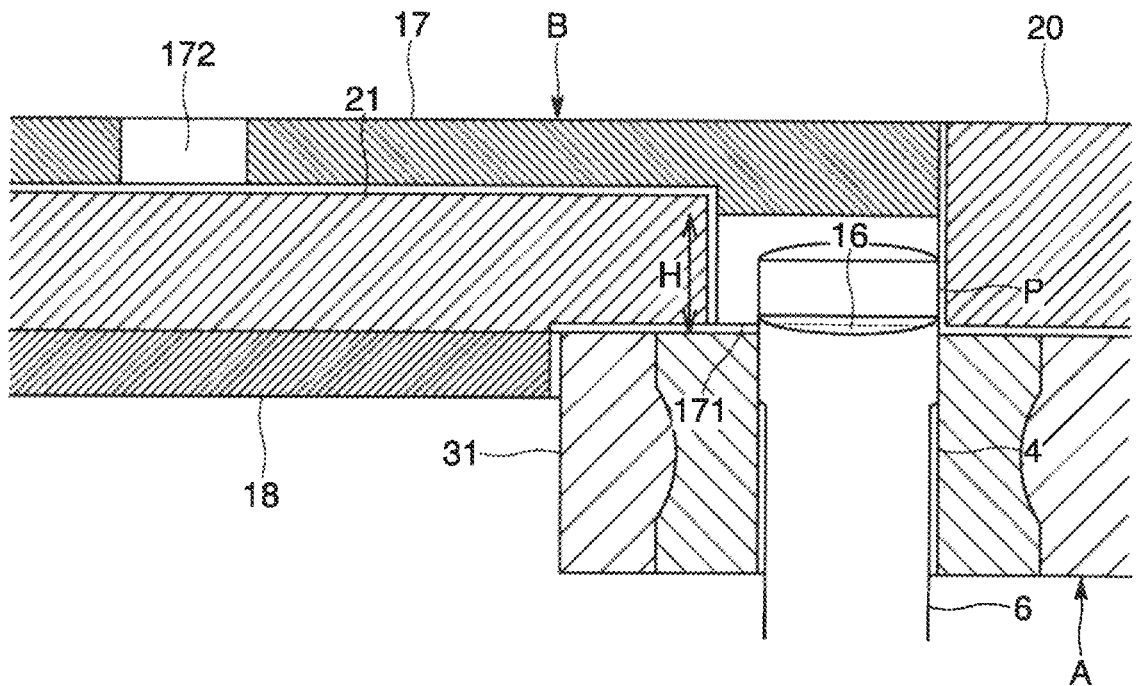
FIG. 5 is a longitudinal sectional view of the main part of the discharge device according to the exemplary embodiment.
Figure 6:
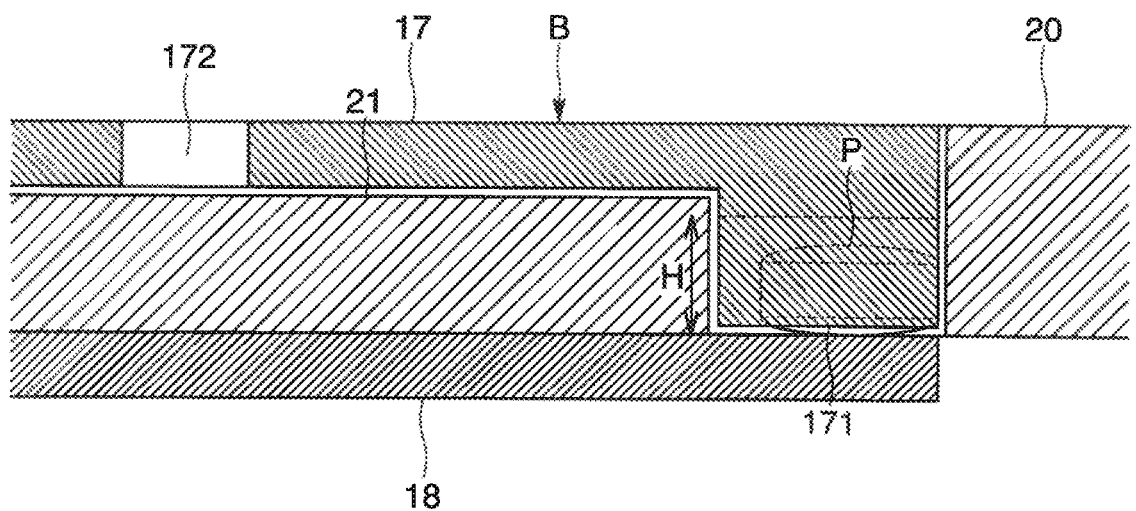
FIG. 6 is another longitudinal sectional view of the main part of the discharge device according to the exemplary embodiment.

As shown exemplarily in FIG. 5, the lower surface of the rotator 17 faces an upper surface of the retainer 18 with a predetermined vertical distance therebetween. The lower surface of the rotator 17 is positioned higher than the upper surface of the die table 31 of the molding machine A. The outer circumferential portion of the rotator 17 partially overlaps the die table 31 of the molding machine A from above. The projections 171 extending from the lower surface of the rotator 17 each have a distal end immediately adjacent to the upper surface of the retainer 18 and the upper surface of the die table 31. Synchronous rotation of the die table 31 and the rotator 17 temporarily overlaps each of the die bores 4 and the gap between the adjacent projections 171 at the delivery position 16 for the molded products P.

Unlike the rotator 17, the retainer 18 does not rotate and is disposed to overlap the outer circumferential portion of the rotator 17 from below. The retainer 18 is disposed adjacent to the die table 31 of the molding machine A and has the upper surface substantially flush with the upper surface of the die table 31. The molded product captured in the gap between the adjacent projections 171 of the rotator 17 slides or rolls on the upper surface of the retainer 18 while horizontally rotating along with the projections 171. In other words, the retainer 18 supports the transferred molded product from below. In order to prevent interference with the die table 31, the retainer 18 has a part that corresponds to the delivery position 16, where the die table 31 and the rotator 17 overlap each other in a planar view, and is cut away in an arc shape along an outer circumferential edge of the die table 31. The part of the retainer 18 has an edge immediately adjacent to the outer circumferential edge of the die table 31 and allows the molded product P to smoothly shift from the upper surface of the die table 31 of the molding machine A onto the upper surface of the retainer 18 of the discharge device B1.

The lower surface of the rotator 17 and the upper surface of the retainer 18 have a clearance H therebetween, which is substantially equal to or larger than vertical thickness of the molded product P by the molding machine A and is smaller than the smallest external size of the molded product P. The smallest external size corresponds to the shortest one of line segments in a planar view, each extending from a certain point on the outer edge of the molded product P to a different point on the outer edge of the molded product P through the gravity center or the geometrical center of the molded product P. In the case where the molded product P has an elliptical shape in a planar view, the smallest external size corresponds to a minor axis or a short diameter. The thickness of the molded product P is substantially equal to a vertical distance between the tip 53 of the upper punch 5 and the tip 63 of the lower punch 6 upon completion of compressing the powdery material filled in the die bore 4 in the molding machine A.

Figure 4:
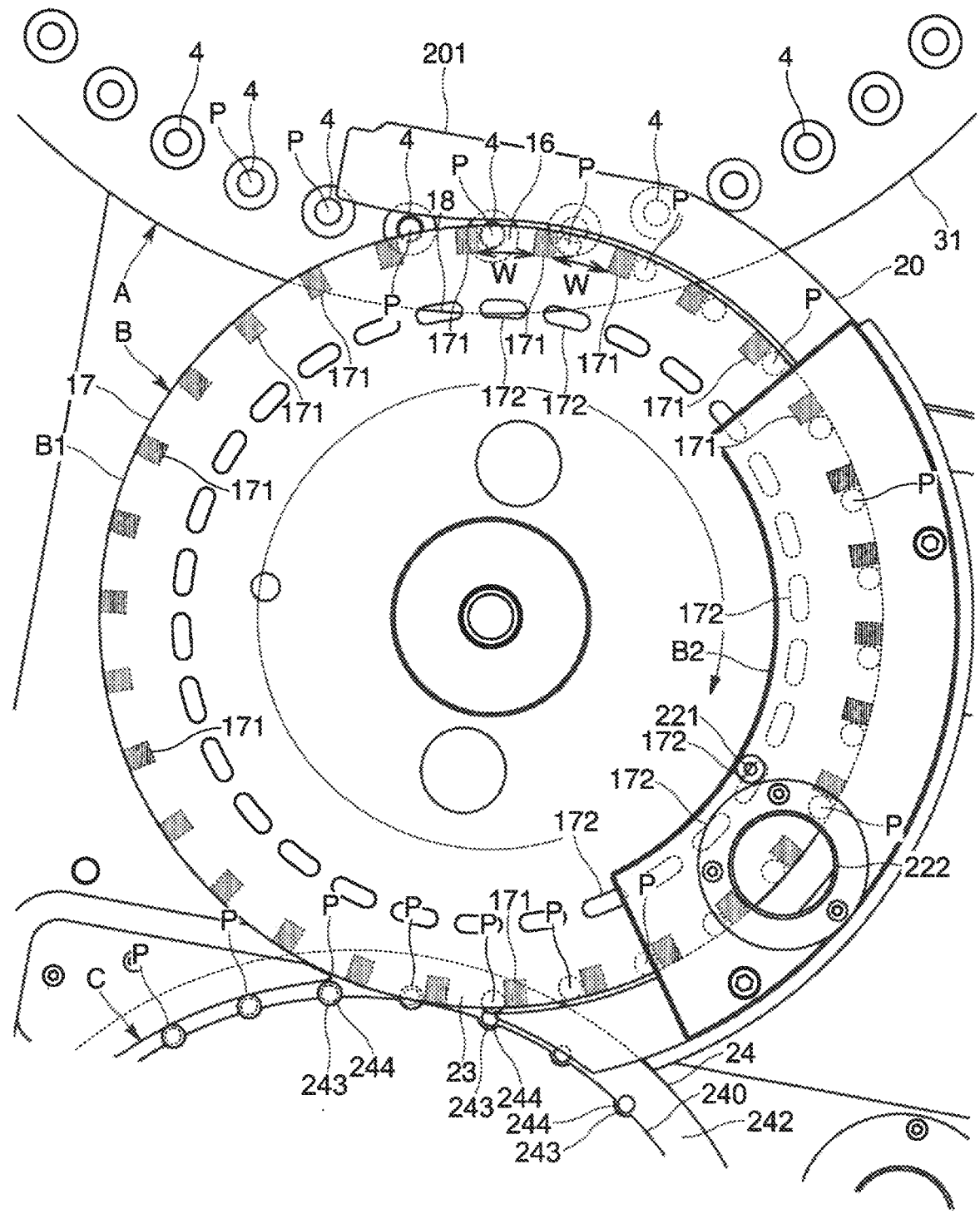
FIG. 4 is a plan view of the main part of the discharge device according to the exemplary embodiment.

As shown exemplarily in FIG. 4, the outer guide 20 is disposed adjacent to the outer circumferential edge of the rotator 17 and expands to have a substantially arc shape surrounding the rotator 17 in a planar view. The guide 20 closes, from outside, the gaps positioned between the adjacent projections 171 and opened radially outward and perpendicularly to the rotary axis 43 of the rotator 17, to inhibit the molded products P from coming outward from the gaps due to centrifugal force. The outer guide 20 has a start edge 201 projecting toward the die table 31 of the molding machine A and overlapping the die table 31 from above to be positioned vertically above a horizontal rotation locus of the die bores 4. The start edge 201 serves as a guide member configured to catch, at the delivery position 16, the molded products P pushed to the upper surface of the die table 31 and to deliver the molded products P to the discharge device B1.

The inner guide 21 is disposed adjacent to radially inner edges of the projections 171 of the rotator 17, and expands to have, in a planar view, a substantially arc shape located inside the outer circumferential portion of the rotator 17. The guide 21 closes, from inside, the gaps opened radially inward on the rotator 17, to inhibit an unintended inward displacement of the molded products. The inner guide 21 is fixed to the retainer 18 or may be formed integrally with the retainer 18, The rotator 17 has a part facing an upper surface of the inner guide 21 and having a lower surface slightly recessed upward from lower surfaces facing the gaps (i.e., portions not having the projections 171) in the outer circumferential portion of the rotator 17. The upper surface of the inner guide 21 excluding an area equipped with a dust removal device B2 to be described later is positioned slightly higher than the lower surfaces facing the gaps in the outer circumferential portion of the rotator 17. This prevents the molded products P from entering a space between the lower surface of the rotator 17 and the upper surface of the inner guide 21.

As described earlier, each of the lower punches 6 in the molding machine A ascends to push the molded product P out of the die bore 4 before the die bore 4 containing the molded product P reaches the delivery position 16. The molded product P having been pushed out comes into contact with the outer guide 20 at the delivery position 16 due to a rotation of the die table 31, and travels along the outer guide 20, The molded product P on the die table 31 then shifts onto the retainer 18. The molded product P is captured by the projections 171 extending downward from the rotator 17 and enters the gap between the adjacent projections 171 in a region between the rotator 17 and the retainer 18. The molded products P are each accommodated in one of the gaps. Thus, the gaps accommodate the molded products P one-by-one in the order of alignment of the die bores 4 in the die table 31 of the molding machine A (i.e., keeping the order of compression molding by the molding machine A). Furthermore, the molded products P will not be reversed vertically while being delivered from the die table 31 of the molding machine A to the rotator 17 of the discharge device B1 in the module B.

Each of the molded products P captured in the gap between the adjacent projections 171 comes into contact with the projection 171 positioned behind in a rotation direction of the rotator 17 and is pushed by the projection 171 to slide or roll to be transferred on the retainer 18 along a rotation locus of the projection 171. Each of the molded products P accommodated in the gap is substantially constantly positioned relatively to the adjacent projections 171. The molded product P is displaced in the gap radially outward from a radially inner position on the rotator 17 because the rotating rotator 17 applies centrifugal force to the molded product P. The molded product P, however, comes into contact with an inner rim of the outer guide 20 to be prevented from being further displaced, so that the molded product P will not come outward from the gap. The rotator 17 closes the gaps from above, so that the molded product P captured in the gap will not suddenly bounce and come out of the gap.

The molded product P captured between the adjacent projections 171 of the rotator 17 is transferred to a delivery position 23 as a transfer end position. The retainer 18 has a part that corresponds to the delivery position 23 and is cut away in an arc shape along an outer circumferential edge of a rotator 24 of a conveying device C1 to be described later, for prevention of interference with the rotator 24. The outer circumferential portion of the rotator 17 and the retainer 18 do not overlap each other in a planar view at the delivery position 23. The molded products P having reached the delivery position 23 are not supported by the retainer 18 from below and drop out of the gaps between the adjacent projections 171 to be delivered to the conveying device C1 in the module C located downstream of and directly connected to the module B while keeping the order of alignment.

The dust removal device B2 configured to remove dust adhering to the molded products P is disposed partially in a conveyance section of the molded products P from the delivery position 16 to the delivery position 23 in the outer circumferential portion of the rotator 17, as a processing device included in the module B.

The rotator 17 has preliminarily formed communicating bores 172 each causing corresponding one of the gaps between the adjacent projections 171 to be communicable with outside. The communicating bores 172 are positioned radially inside the gaps of the rotator 17 and vertically penetrate the rotator 17 as long bores extending circumferentially in the rotator 17. The communicating bores 172 are equal in number to that of the gaps. The dust removal device B2 covers, from above, the communicating bores 172, the gaps between the adjacent projections 171, and a boundary between the rotator 17 and the outer guide 20, and expands circumferentially along the rotator 17.

Figure 7:
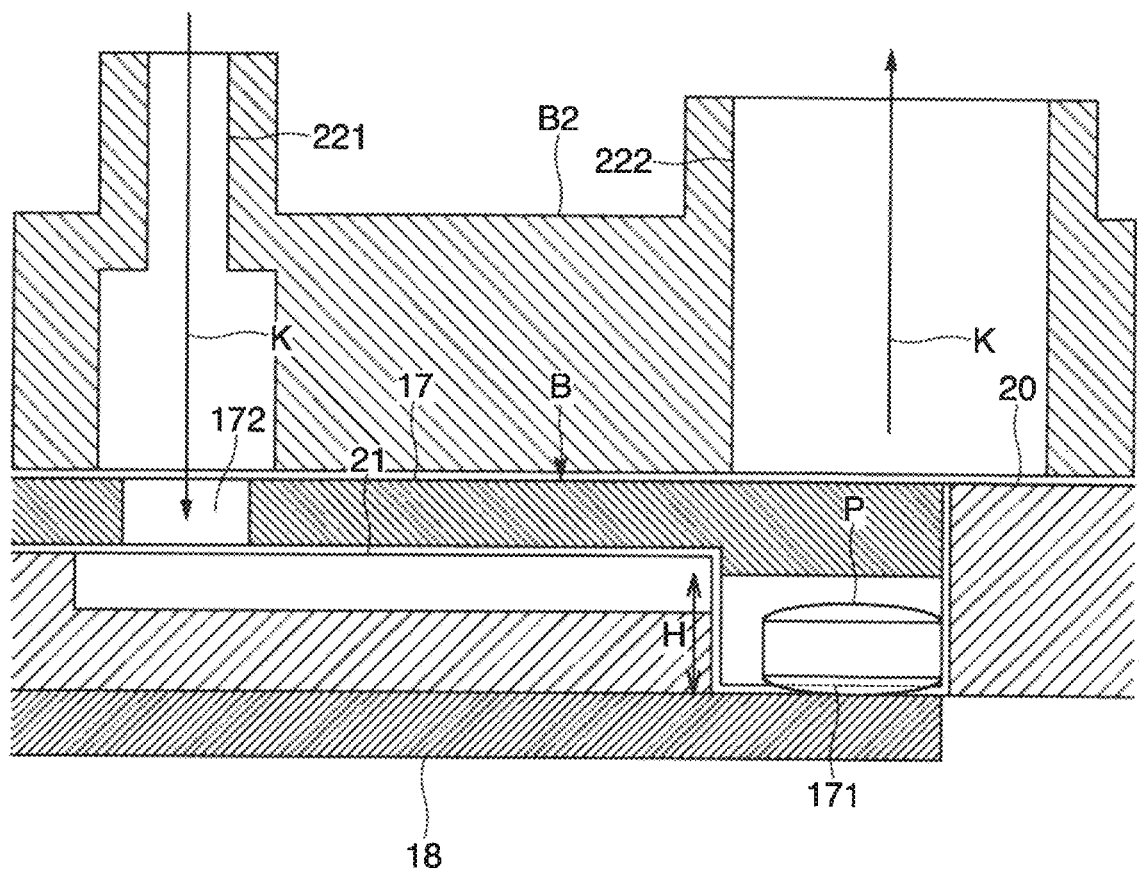
FIG. 7 is a longitudinal sectional view of main parts of the discharge device and a dust removal device according to the exemplary embodiment.
Figure 8:
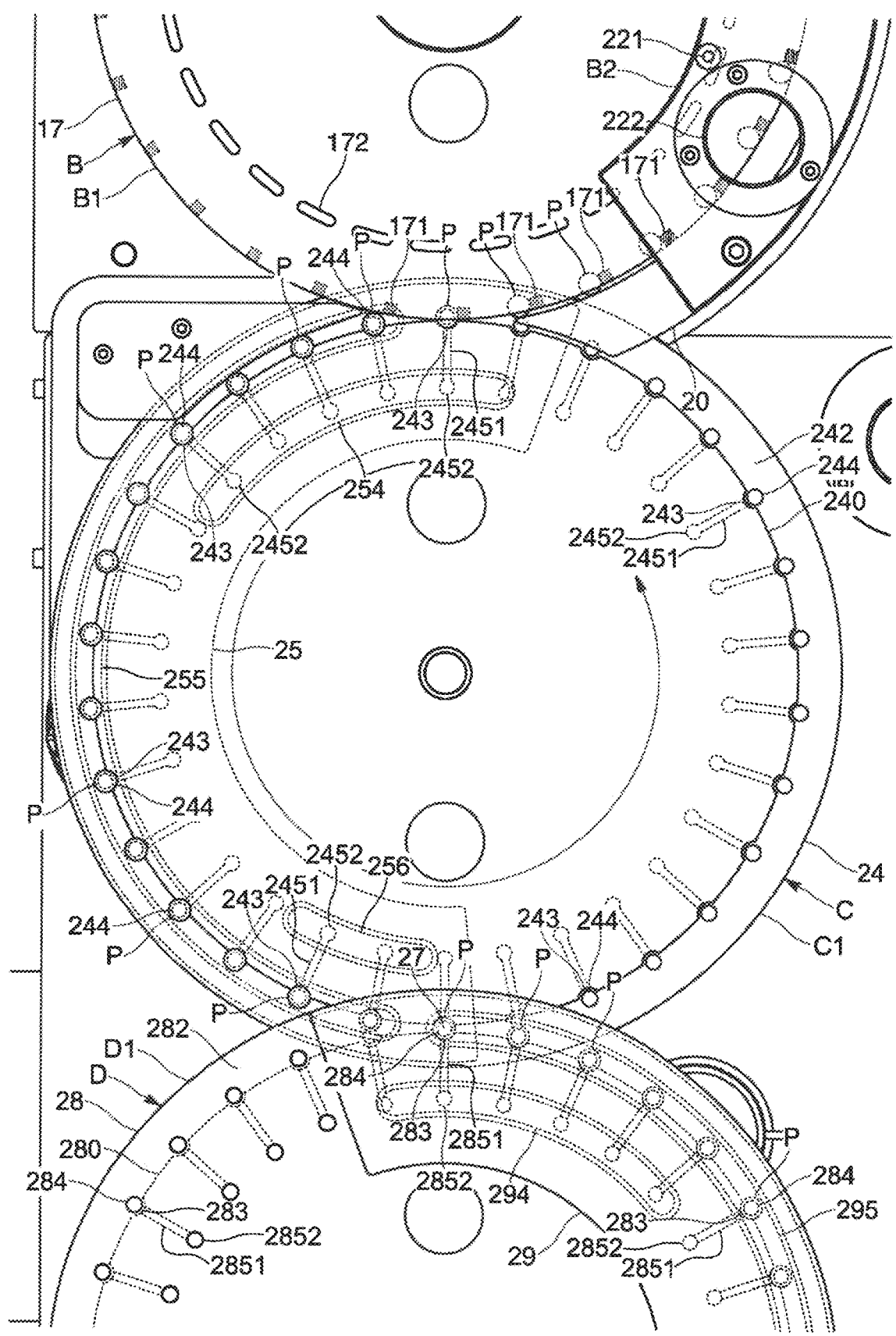
FIG. 8 is a plan view of a main part of a conveying device according to the exemplary embodiment.

As shown exemplarily in FIG. 7, the dust removal device B2 includes a spray nozzle 221 positioned vertically above the communicating bore 172 and configured to spray compressed air K fed from a pump (not shown), downward toward the communicating bore 172, and a dust collecting port 222 positioned vertically above the boundary between the rotator 17 and the outer guide 20 and configured to suck the air K upward with use of a pump (not shown). The compressed air K can be preliminarily ionized by a static eliminator, and can be sprayed in a pulsed manner. The compressed air K fed from the spray nozzle 221 reaches the gap between the adjacent projections 171 through the space between the lower surface of the rotator 17 and the upper surface of the inner guide 21, and is sprayed to an exterior of the molded product P accommodated in the gap to blow off and to remove dust adhering to the exterior of the molded product P. The air K having hit the molded product P and containing dust leaks upward through a space between the rotator 17 and the outer guide 20 and is sucked to the dust collecting port 222.

The conveying device C1 in the module C connected behind the module B receives the molded products P from the discharge device B1 at the delivery position 23 for the molded products P, and conveys the molded products P to processing devices C2 and C3 each configured to apply a subsequent process to the molded products P. The molded products P are kept aligned in the order of molding by the molding machine A also when the molded products P are delivered from the discharge device B1 to the conveying device C1. As shown exemplarily in FIGS. 8 to 11, the conveying device C1 mainly includes the rotator 24 serving as a transfer body configured to horizontally rotate about a vertical axis in synchronization with the rotator 17 of the discharge device B1.

The rotator 24 rotates counterclockwise in the figures relatively to the rotator 17 that rotates clockwise in the figures. In order to synchronize rotation between the rotator 17 and the rotator 24, as shown exemplarily in FIGS. 17 and 19, the rotary axis 43 of the rotator 17 and a rotary axis 44 of the rotator 24 are mechanically connected to interlock via a gear transmission mechanism 41, a winding transmission mechanism, or the like. Alternatively, the rotator 24 may be rotated by a motor configured as a servo motor or a stepping motor, and angular position sensors such as rotary encoders may detect a rotation angle and rotational speed of each of the rotator 17 and the rotator 24, to enable feedback control of rotational speed of the motor for synchronized rotation between the rotator 17 and the rotator 24.

The rotator 24 has a substantially circular disc shape in a planar view as viewed from a direction of the rotary axis 44 of the rotator 24 (i.e., in the vertical direction). More specifically, the rotator 24 includes two circular disc plates 240 and 241 sized differently in outer diameter such that the circular disc plate 240 having a smaller outer diameter is overlapped on the circular disc plate 241 having a larger outer diameter to be firmly coupled with each other and be integrated. The lower circular disc plate 241 has an outer circumferential portion 242 that accordingly expands radially outward and perpendicularly to the rotary axis 44 of the rotator 24, from a basal portion of the rotator 24 (i.e., an outer circumferential edge of the upper circular disc plate 240). The outer circumferential portion 242 serves as a flange of the rotator 24.

The basal portion of the rotator 24 has an outer circumferential surface including pockets 243 that are recessed radially inward and are opened radially outward. The outer circumferential edge of the basal portion has a substantially circular shape and is recessed to come closer to the rotary axis 44 of the rotator 24 only at the pockets 243. The flange 242 includes suction bores 244 positioned to confront the pockets 243 from one side along a direction of the rotary axis 44 (i.e., confront from below, and each having a closed peripheral edge). When the rotator 24 is viewed vertically, each of the suction bores 244 is at least partially overlapped with a corresponding one of the pockets 243 and is opened upward toward the pocket 243. The suction bores 244 each have an inner peripheral edge extending along an inner wall surface of the pocket 243 in a planar view. Each of the suction bores 244 vertically penetrates the flange 242.

The pockets 243 and the suction bores 244 are disposed along an outer end of the rotator 24 circumferentially around the rotary axis 44 of the rotator 24, to be spaced apart from each other at predetermined intervals. These pockets 243 and the suction bores 244 obviously rotate integrally with the rotator 24. Each of the molded products P delivered from the discharge device B1 in the module B to the conveying device C1 in the module C is transferred while being engaged with the pocket 243 and the suction bore 244 of the rotator 24 and captured by the suction bore 244.

Figure 9:
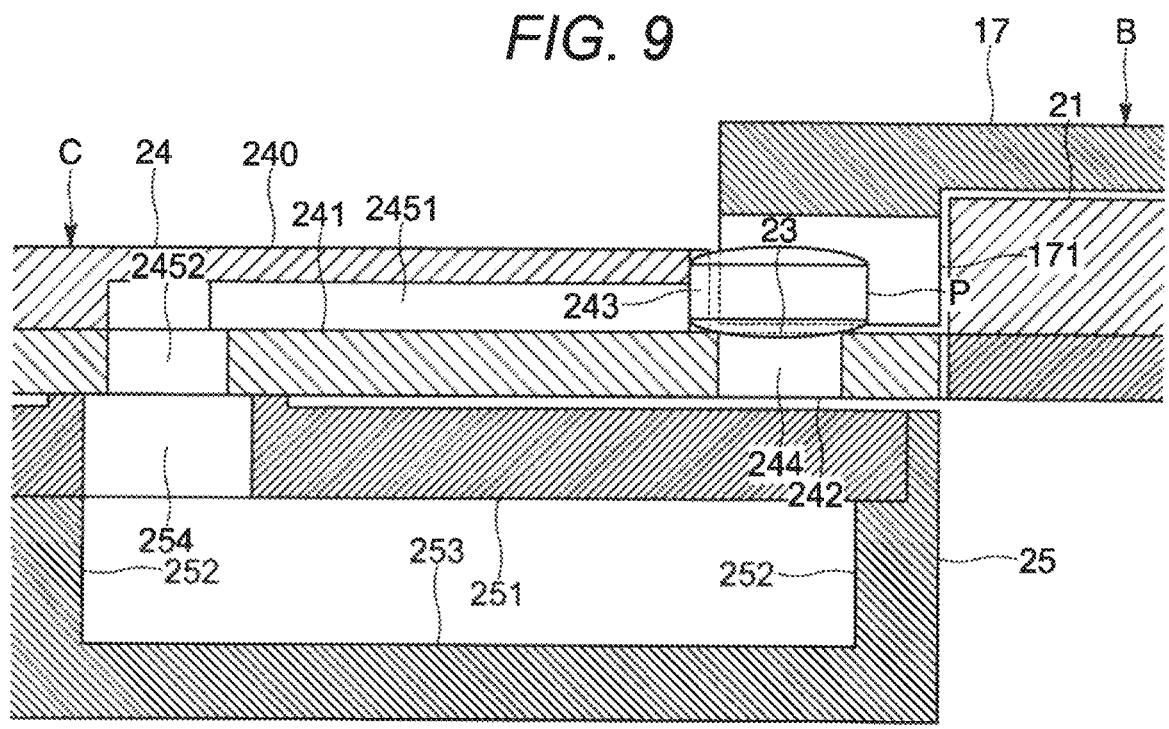
FIG. 9 is a longitudinal sectional view of the main part of the conveying device according to the exemplary embodiment.

As shown exemplarily in FIG. 9, in the outer circumferential portion of the rotator 24 in the conveying device C1, the flange 242 has an upper surface that is positioned below the lower surface of the rotator 17 and is substantially flush with the upper surface of the retainer 18 in the discharge device B1 in the module B. The outer circumference and the pockets 243 in the basal portion of the rotator 24 are substantially flush with the gaps between the adjacent projections 171 of the rotator 17 to horizontally face the gaps. Furthermore, part of the flange 242 of the rotator 24 overlaps with part of the rotator 17 from below in a planar view, and both vertically face each other. The distal ends of the projections 171 extending from the lower surface of the rotator 17 are immediately adjacent to the upper surface of the retainer 18 and the upper surface of the flange 242. Synchronous rotation between the rotator 17 and the rotator 24 causes each of the gaps between the adjacent projections 171 and a corresponding one of the suction bores 244 to temporarily overlap each other at the delivery position 23.

In order to prevent interference with the flange 242 of the rotator 24, the part of the retainer 18, corresponding to the delivery position 23 where the flange 242 and the rotator 17 overlap with each other in a planar view, is cut away in an arc shape along an outer circumferential edge of the flange 242. The part of the retainer 18 has an edge immediately adjacent to the outer circumferential edge of the flange 242 and allows the molded product P to smoothly shift from the upper surface of the retainer 18 in the discharge device B1 to the upper surface of the flange 242 of the rotator 24 in the conveying device C1.

At the delivery position 23, the molded product P accommodated in the gap between the adjacent projections 171 of the rotator 17 and having been transferred by being pushed by the projection 171 shifts from the retainer 18 onto the flange 242 of the rotator 24 due to a rotation of the rotator 17, The molded product P enters the pocket 243 in the rotator 24 and is captured by the suction bore 244. The molded products P are each accommodated in one of the suction bores 244. The suction bores 244 thus engage with the molded products P one-by-one in the order of alignment of the gaps between the adjacent projections 171 of the rotator 17 in the discharge device B1 (i.e., keeping the order of compression molding by the molding machine A). The molded products P will not be reversed vertically while being delivered from the rotator 17 of the discharge device B1 to the rotator 24 of the conveying device C1.

The molded products P captured by the suction bores 244 are transferred along a rotation locus of the suction bores 244 due to a rotation of the rotator 24. Each of the molded products P accommodated in the suction bore 244 is substantially constantly positioned relatively to the rotator 24 and the suction bore 244. The molded product P receives a centrifugal force due to the rotation of the rotator 24, but is sucked to the suction bore 244 so as not to be displaced outward. Furthermore, the molded products P will not be reversed vertically in the transfer process.

The molded product P captured by the suction bore 244 is eventually transferred to a delivery position 27 as a transfer end position. The molded product P having reached the delivery position 27 is delivered from the conveying device C1 in the module C to a conveying device D1 included in the module D located downstream of and directly connected to the module C.

Described below is a mechanism configured to suck the molded products P to the pockets 243 and the suction bores 244 of the rotator 24. The pockets 243 and the suction bores 244 each have negative pressure, to suck the molded product P to the pocket 243 and the suction bore 244. As shown exemplarily in FIGS. 8 to 11, the rotator 24 preliminarily includes suction passages 2451 and 2452 configured to feed the pockets 243 with negative pressure. The suction passages 2451 and 2452 include an inner passage 2451 having a start portion opened at an innermost position in the inner wall surface of each of the pockets 243, formed inside the rotator 24, and extending inward toward the rotary axis 44 of the rotator 24, and a suction port 2452 formed by drilling upward from a lower surface of the rotator 24 to an end portion of the inner passage 2451 to allow the inner passage 2451 to communicate with the lower surface of the rotator 24. Specifically, the inner passage 2451 is a groove disposed in a lower surface of the upper circular disc plate 240 as the basal portion of the rotator 24 and opened downward. The groove 2451 is closed from below, by the circular disc plate 241 joined to the lower surface of the circular disc plate 240. The suction port 2452 is a through hole vertically penetrating a part of the lower circular disc plate 241, positioned vertically below the end portion of the inner passage 2451. The suction passages 2451 and 2452 allow each of the pockets 243 to communicate with the position of the suction port 2452 displaced inward from the pocket 243 in the lower surface of the rotator 24. The numbers of the suction passages 2451 and 2452 are equal to the number of pairs of the pockets 243 and the suction bores 244.

Atmospheres in the inner passages 2451 and the pockets 243 can be sucked via the suction ports 2452 to feed the pockets 243 with negative pressure. The rotator 24 is equipped therebelow with a negative pressure feeding duct 25 that extends along the outer circumference of the rotator 24 in a planar view to have a semi-arc shape. The duct 25 has a tubular body surrounding its internal space with a top wall 251 immediately close to the lower surface of the rotator 24, side walls 252 vertically extending downward from an inner side end and an outer side end of the top wall 251, and a bottom wall 253 connecting lower ends of the side walls 252. The internal space of the duct 25 is sucked by a pump (not shown) to have negative pressure.

The top wall 251 of the duct 25 has two slots 254 and 256 each of which is positioned vertically below the suction ports 2452 and has a partial arc shape around the rotary axis 44 of the rotator 24 in a planar view. The slots 254 and 256 vertically penetrate the top wall 251. The slots 254 and 256 extend along a travel locus of the suction ports 2452 according to the rotation of the rotator 24. The former slot 254 extends along the rotation of the rotator 24 in a range from a position upstream of the delivery position 23 for the molded products P from the discharge device B1, to a predetermined position downstream of the delivery position 23. The latter slot 256 extends along the rotation of the rotator 24 in a range from a position upstream of the delivery position 27 for the molded products P to the conveying device D1, to a position just before the delivery position 27.

Each of the pockets 243 is fed with negative pressure or is sucked only while the suction port 2452 in the suction passages 2451 and 2452 connected to the pocket 243 is positioned vertically above either one of the slots 254 and 256 (i.e., while the internal space having negative pressure in the duct 25 communicates with the pocket 243). When the suction port 2452 is not positioned vertically above the slot 254 or 256, the top wall 251 is located between the internal space of the duct 25 and the suction port 2452 to isolate the internal space of the duct 25 from the pocket 243 and prevent suction of the pocket 243.

The duct 25 also functions to feed the suction bores 244 with negative pressure. The top wall 251 of the duct 25 includes a slot 255 that is positioned vertically below the suction bores 244 and has a partial arc shape around the rotary axis 44 of the rotator 24 in a planar view. The slot 255 also vertically penetrates the top wall 251. The slot 255 extends along a travel locus of the suction bores 244 according to the rotation of the rotator 24. The slot 255 extends along the rotation of the rotator 24 in a range from a position just after the delivery position 23 for the molded products P from the discharge device B1, to a position just before the delivery position 27 for the molded products P to the conveying device D1.

Each of the suction bores 244 is fed with negative pressure or is sucked only while the suction bore 244 is positioned vertically above the slot 255 (i.e., while the internal space having negative pressure in the duct 25 communicates with the suction bore 244). When the suction bore 244 is not positioned vertically above the slot 255, the top wall 251 isolates the internal space of the duct 25 from the suction bore 244 to prevent suction of the suction bore 244.

In a process of delivering the molded product P captured in the gap between the adjacent projections 171 of the rotator 17 in the discharge device B1 to a corresponding pair of the pocket 243 and the suction bore 244 of the rotator 24 in the conveying device C1, the pair of the pocket 243 and the suction bore 244 positioned upstream of the delivery position 23 and not retaining the molded product P initially moves toward the delivery position 23. When the pair of the pocket 243 and the suction bore 244 reach a position just before the delivery position 23, the suction port 2452 connected to the pocket 243 via the inner passage 2451 reaches vertically above the slot 254 and the negative pressure feeding duct 25 starts sucking the pocket 243. The suction bore 244 paired with the pocket 243 has not yet reached vertically above the slot 255 at this point, so that the suction bore 244 is not sucked.

In the pair of the pocket 243 and the suction bore 244 having reached the delivery position 23 for the molded products P, the pocket 243 is sucked but the suction bore 244 is not sucked. The molded product P captured in the gap between the adjacent projections 171 of the rotator 17 and having reached the delivery position 23 is sucked inward to come closer to the rotary axis 44 of the rotator 24 toward the pocket 243 to be engaged with the pocket 243. The molded product P is thus constantly positioned relatively to the suction bore 244.

When the pocket 243 sucking the molded product P and the suction bore 244 paired with the pocket 243 move downstream from the delivery position 23, the suction bore 244 reaches vertically above the slot 255 and the negative pressure feeding duct 25 starts sucking the suction bore 244. The molded product P sucked to the pocket 243 is accordingly sucked also to the suction bore 244. The suction port 2452 connected to the pocket 243 via the inner passage 2451 is still positioned vertically above the slot 254 at this point, and both the pocket 243 and the suction bore 244 are fed with negative pressure.

When the rotator 24 rotates and the pocket 243 and the suction bore 244 sucking the molded product P move further downstream, the suction port 2452 connected to the pocket 243 via the inner passage 2451 leaves the position vertically above the slot 254 to stop suction of the pocket 243 and cause the molded product P not to be sucked to the pocket 243. In contrast, the suction bore 244 sucking the molded product P is still positioned vertically above the slot 255, to allow the molded product P to be continuously sucked to and captured by the suction bore 244.

When the suction bore 244 sucking the molded product P moves downstream and comes close to the delivery position 27 for the molded product P to the conveying device D1, the suction port 2452 connected, via the inner passage 2451, to the pocket 243 paired with the suction bore 244 reaches vertically above the slot 256 and the negative pressure feeding duct 25 starts sucking the pocket 243 to allow the molded product P to be sucked also to the pocket 243 only temporarily.

When the pocket 243 and the suction bore 244 sucking the molded product P subsequently reach the position just before the delivery position 27, the suction bore 244 leaves the position vertically above the slot 255 to stop suction of the suction bore 244 and cause the molded product P not to be sucked to the suction bore 244. Substantially simultaneously or immediately thereafter, the suction port 2452 connected to the pocket 243 sucking the molded product P via the inner passage 2451 leaves the position vertically above the slot 256 to also stop suction of the pocket 243 and cause the molded product P not to be sucked to the pocket 243. The molded product P in this state is delivered from the rotator 24 of the conveying device C1 to a rotator 28 of the conveying device D1.

The foreign matter inspection device (e.g., possibly a metal detector) C2 configured to inspect whether or not the molded products P each contain foreign matter or the quality inspection device C2 configured to inspect quality such as components of the molded products P, and the exterior inspection device C3 as an inspection device or an inspection device according to the exemplary invention configured to inspect an exterior condition of each of the molded products P, are disposed in a part of conveyance section of the molded products P from the delivery position 23 to the delivery position 27 in the outer circumferential portion of the rotator 24, as processing devices included in the module C.

Figure 10:
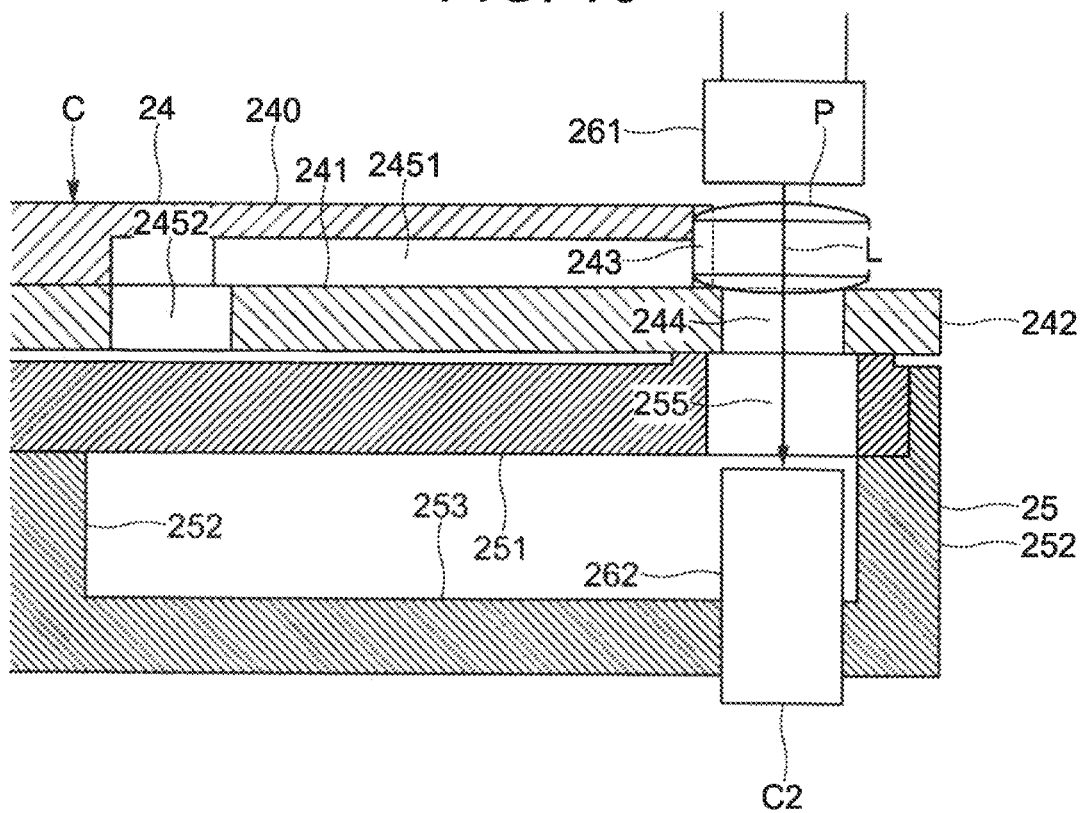
FIG. 10 is a longitudinal sectional view of main parts of the conveying device and a processing device according to the exemplary embodiment.

As shown exemplarily in FIG. 10, the foreign matter inspection device or quality inspection device C2 includes, as constituent elements, a light source 261 positioned to overlap a travel locus of the molded products P conveyed by the conveying device C1 in a planar view, and a sensor 262 functioning as a light receiving element. The light source 261 and the sensor 262 are disposed to vertically face each other along a direction of the rotary axis 44 of the rotator 24, and sandwich the molded product P and the rotator 24 configured to convey the molded products P. The light source 261 emits light or an electromagnetic wave L that includes transmitted light L through the molded product P to be incident on the sensor 262 as signal light. The signal light L is analyzed to inspect whether or not the molded product P contains any foreign matter and/or whether or not the molded product P has appropriate quality such as components. The device C2 can be configured to execute near infrared reflectance or X-ray inspection (e.g., a radioscopy or transmission measurement).

Figure 11:
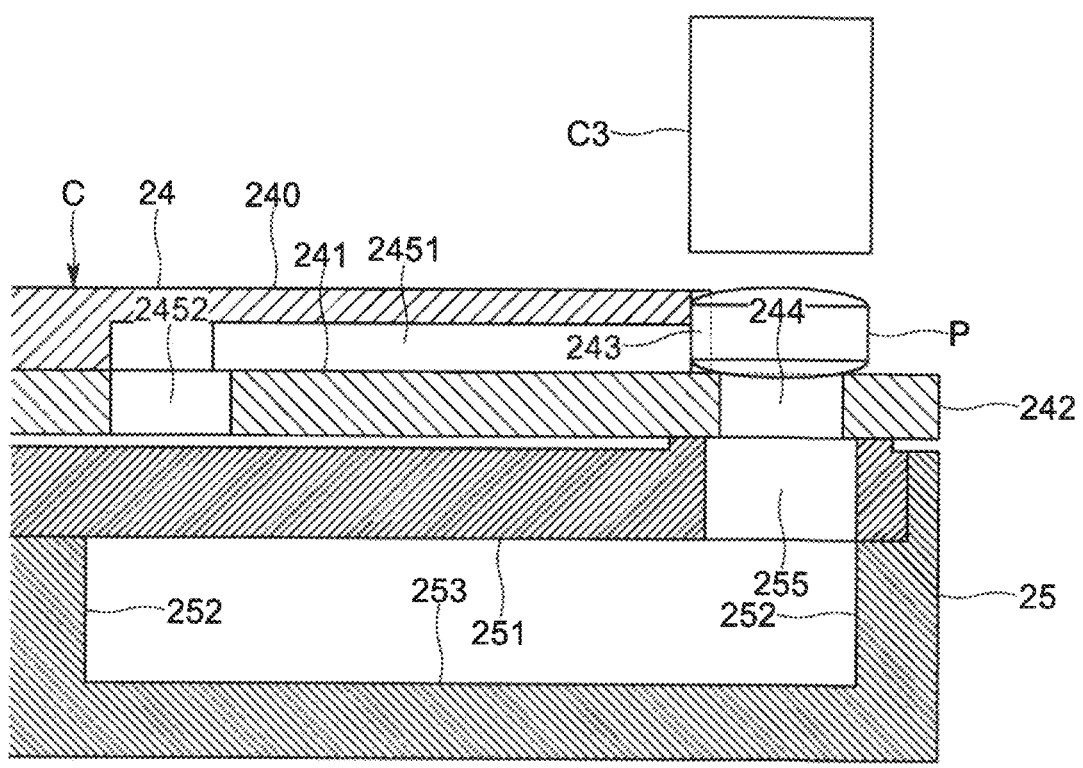
FIG. 11 is another longitudinal sectional view of the main parts of the conveying device and the processing device according to the exemplary embodiment.
Figure 20:
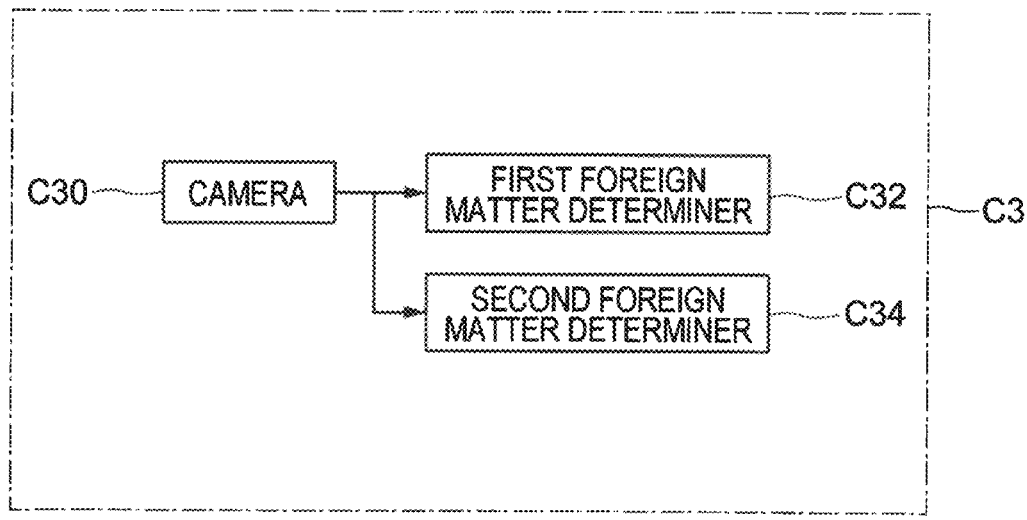
FIG. 20 is a functional block diagram of an exterior inspection device according to the exemplary embodiment.

As shown exemplarily in FIG. 11, the exterior inspection device C3 includes a camera C30 (e.g., shown exemplarily in FIG. 20) configured to image a predetermined surface like the upper surface of each of the molded products P captured by the suction bore 244 and transferred, to obtain an image thereof. The obtained picture can be used for inspection of the exterior condition of the molded product P. Specifically, the obtained picture can be analyzed, be compared with a picture of a normal molded product P, or the like to enable determination of whether the exterior of the molded product P is in a normal or a defective condition.

Figure 21:
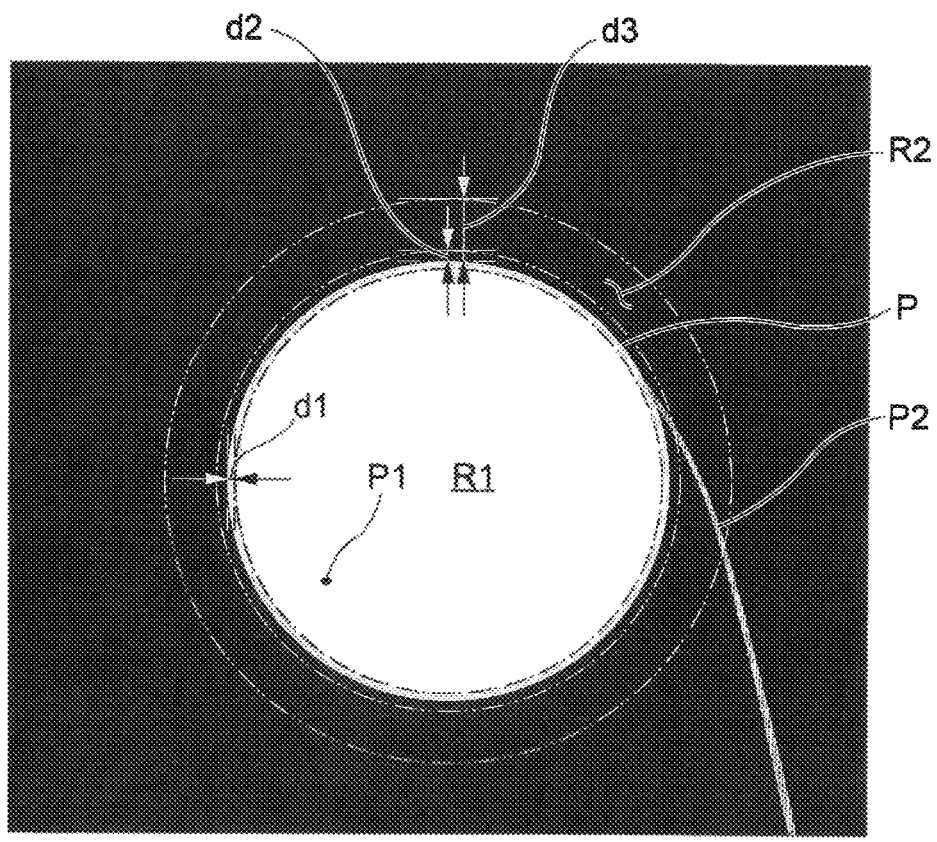
FIG. 21 is a view of an exemplary image taken by a camera according to the exemplary embodiment.

The exterior inspection device C3 is constituted by the camera C30 configured to obtain an image of a molded product, and a controller (not shown). When the processor of the controller reads a foreign matter determination program stored in a predetermined region of the auxiliary storage device to cause the camera C30 and the controller to cooperate with each other, as shown exemplarily in a functional block diagram in FIG. 20, the exterior inspection device C3 functions as a first foreign matter determiner C32 configured to determine whether or not, in an obtained image of the molded product P, a first inspection region R1 (e.g., as shown exemplarily in FIG. 21) located inside an outline of an assumed normal molded product P includes foreign matter, and a second foreign matter determiner C34 configured to determine whether or not, in the obtained image of the molded product P, a second inspection region located outside the outline of the assumed normal molded product P includes foreign matter. The first inspection region R1 according to the exemplary embodiment is set inside, by at least a first predetermined distance d1, the outline of the assumed normal molded product P. A second inspection region R2 is set outside, by at least a second predetermined distance d2 and inside, by a third predetermined distance d3 or less, the outline of the assumed normal molded product P. The first foreign matter determiner C32 and the second foreign matter determiner C34 each determine "foreign matter" conceptually including foreign matter mixed in the molded product P, as well as any exterior abnormality of the molded product P such as a black spot or color irregularity. The camera C30, according to the exemplary embodiment, obtains the image of the molded product P in white (or a color similar to white) appearing in a background portion in black (or a color similar to black). The camera C30 and the light source (not shown) are disposed on an identical side with respect to the molded product P. FIG. 21 exemplifies the image obtained with the use of the camera C30. The image exemplified in FIG. 21 shows foreign matter P1 exposed on the upper surface of the molded product P, and foreign matter P2 having a string shape and projecting from a side surface of the molded product P.

The first foreign matter determiner C32 determines whether or not the first inspection region R1 includes the foreign matter P1 based on the image of the molded product P obtained by the camera C30, Specifically, the first foreign matter determiner determines that there is the foreign matter P1 if a portion in any color different from white as the color of the molded product P occupies at least a predetermined ratio in an image of the first inspection region R1.

The second foreign matter determiner C34 determines whether or not the second inspection region R2 includes the foreign matter P1 based on the image of the molded product P obtained by the camera C30, Specifically, the second foreign matter determiner determines that there is foreign matter if a portion in any color different from black as the color of the background occupies at least a predetermined ratio in an image of the second inspection region R2.

When the first foreign matter determiner C32 or the second foreign matter determiner C34 determines that there is foreign matter, the foreign matter determiner stores linked information indicating that the molded product P contains the foreign matter.

Figure 22:
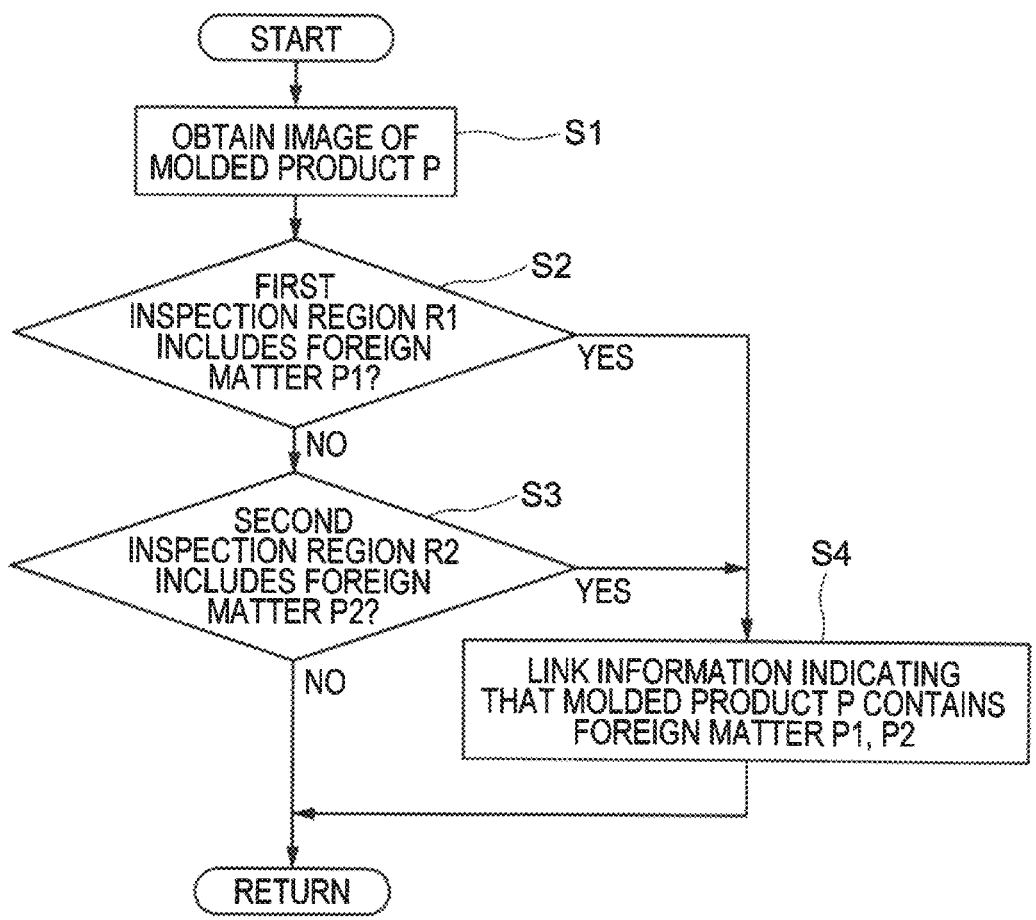
FIG. 22 is a flowchart showing processing executed by the exterior inspection device according to the exemplary embodiment.

A flow of the processing executed by the exterior inspection device C3 will be described below with reference to a flowchart in FIG. 22.

The camera obtains an image of the molded product P (step S1). Subsequently, whether or not the first inspection region R1 includes foreign matter is determined based on the image obtained in step S1 (step S2). In a case where the first inspection region R1 includes foreign matter (i.e., a "YES" in step linked information indicating that the molded product P contains the foreign matter is stored (step S4), and the process according to the foreign matter determination program ends. In another case where the first inspection region R1 includes no foreign matter (i.e., a "NO" in step S2), whether or not the second inspection region R2 includes foreign matter is determined based on the image obtained in step S1 (step S3). In a case where the second inspection region R2 includes foreign matter (i.e., a "YES" in step S3), linked information indicating that the molded product P contains the foreign matter is stored (step S4), and the process according to the foreign matter determination program ends. In another case where the second inspection region R2 includes no foreign matter (i.e., a "NO" in step S3), the process according to the foreign matter determination program readily ends.

The camera C30 in the exterior inspection device C3 can be configured to image the upper surface of the molded product P, as well as the lower surface of the molded product P. Pictures of the upper surface and the lower surface of the molded product P can be analyzed to obtain a width, a length, a diameter, and an area, and the like of the molded product P. A side surface of the molded product P can optionally be imaged for determination of whether the molded product P is in a normal or a defective condition. The picture of the side surface of the molded product P can be analyzed to obtain a height (i.e., thickness) of the molded product P. The exterior inspection device C3 functioning as a three-dimensional measurement device adopting an optical cutting method is configured to obtain three-dimensional data on the molded product P, and the obtained data can be analyzed for determination of whether the exterior of the molded product P is in a normal or a defective condition. The exterior inspection device C3 can be configured to execute either one of these processes, or can be configured to execute some of the processes in combination.

Returning to exemplary FIGS. 8-10, the suction bores 244 each capturing the molded product P vertically penetrates the flange 242 of the rotator 24, and one of the light source 261 and the sensor 262 is positioned vertically above the flange 242, whereas the other one thereof is positioned vertically below the flange 242. In a planar view in the vertical direction, the peripheral edge of the suction bore 244 is entirely closed continuously and is sized and shaped to be located inside the outer edge of the molded product P sucked to the suction bore 244. When the suction bore 244 capturing the molded product P passes through areas of the foreign matter inspection device or quality inspection device C2 and the exterior inspection device C3, the molded product P tightly adheres to the suction bore 244 with no gap (or substantially no gap) between the peripheral edge of the suction bore 244 and the outer edge of the molded product P due to negative pressure fed from the duct 25 into the suction bore 244.

In the foreign matter inspection device or quality inspection device C2, the signal light L having transmitted through the molded product P is appropriately incident on the sensor 262 via the suction bore 244, whereas stray light other than the signal light L, which has not transmitted though the molded product P, is shielded by the rotator 24 and the flange 242 and inhibited from being incident on the sensor 262. The molded product P sucked to the suction bore 244 and retained is conveyed in the rotation direction of the rotator 24, while being constantly positioned relatively to the rotator 24 and the suction bore 244. This is effectual for processing of analyzing the signal light L having transmitted through the molded product P that has received light or the electromagnetic wave L, processing of imaging the molded product P with use of a camera for an exterior inspection, and the like.

The die table 31 of the molding machine A, the rotator 17 of the discharge device B1 in the module B, and the rotator 24 of the conveying device C1 in the module C rotate in synchronization with one another. The controller of the molding machine A and the processing system S according to the exemplary embodiment refers to a signal outputted from the angular position sensor (e.g., a rotary encoder) accompanying the turret 3 of the molding machine A, the rotator 17 of the discharge device B1, or the rotator 24 of the conveying device C1, to find current positions of the suction bores 244 aligned circumferentially around the rotary axis 44 of the rotator 24. Furthermore, it is possible to find a current position in the module C, of the molded product P compression molded in the die bore 4 having a certain order number in the die table 31 of the molding machine A. This indicates that the molded product P having just passed in front of the sensor 262 of the foreign matter inspection device or quality inspection device C2 or the camera of the exterior inspection device C3 (i.e., having gone through foreign matter inspection, quality inspection, or exterior inspection), is molded in the die bore 4 having a certain order number. The controller stores to hold in the storage device, information on a result of inspection of the exterior or the like of the molded product P (i.e., a result of determination of whether or not the target molded product P contains any foreign matter, whether or not the target molded product P has defective quality, whether the exterior of the target molded product P is in a normal or defective condition, or the like) with use of the foreign matter inspection device or quality inspection device C2, or the exterior inspection device C3, in association with an ID number indicating a certain order number of the die bore 4 used for molding the target molded product P.

Figure 12:
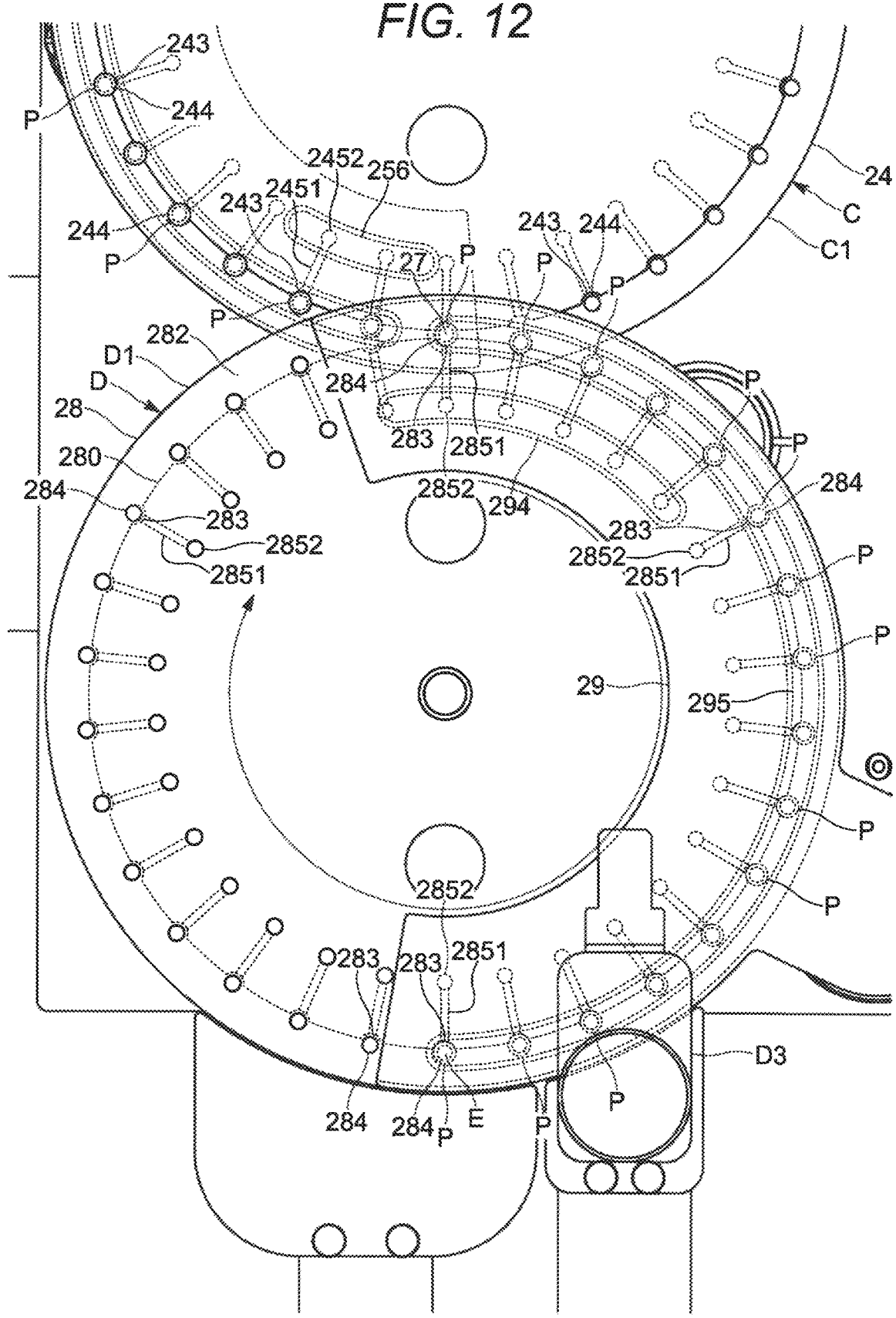
FIG. 12 is a plan view of the main part of the conveying device according to the exemplary embodiment.

As shown exemplarily in FIG. 12, the conveying device D1 in the module D, connected behind the module C, receives the molded products P from the conveying device C1 at the delivery position 27 for the molded products P, and conveys the molded products P to a processing device D2 configured to apply a subsequent process to the molded products P. The molded products P are kept aligned in the order of molding by the molding machine A also when the molded products P are delivered from the conveying device C1 to the conveying device D1. As shown exemplarily in FIGS. 12 to 15, the conveying device D1 mainly includes the rotator 28 serving as a transfer body configured to horizontally rotate about a vertical axis in synchronization with the rotator 24 of the conveying device C1.

The rotator 28 of the conveying device D1 rotates clockwise in the figures relatively to the rotator 24 of the conveying device C1 that rotates counterclockwise in the figures. In order to synchronize rotation between the rotator 24 and the rotator 28, as shown exemplarily in FIGS. 17 and 19, the rotary axis 44 of the rotator 24 and a rotary axis 45 of the rotator 28 may be mechanically connected to interlock via a gear transmission mechanism 42, a winding transmission mechanism, or the like. Alternatively, the rotator 28 may be rotated by a motor configured as a servo motor or a stepping motor, and angular position sensors such as rotary encoders may detect a rotation angle and rotational speed of each of the rotator 24 and the rotator 28, to enable a feedback control of a rotational speed of the motor for synchronized rotation between the rotator 24 and the rotator 28.

The rotator 28 has a substantially circular disc shape in a planar view as viewed from a direction of the rotary axis 45 of the rotator 28 (i.e., in the vertical direction). More specifically, the rotator 28 includes two circular disc plates 280 and 281 sized differently in outer diameter, such that the circular disc plate 281 having a larger outer diameter is overlapped on the circular disc plate 280 having a smaller outer diameter to be firmly coupled with each other and be integrated. The upper circular disc plate 281 has an outer circumferential portion 282 that accordingly expands radially outward and perpendicularly to the rotary axis 45 of the rotator 28, from a basal portion of the rotator 28 (i.e., an outer circumferential edge of the lower circular disc plate 280). The outer circumferential portion 282 serves as a flange of the rotator 28.

The basal portion of the rotator 28 has an outer circumferential surface including pockets 283 that are recessed radially inward and are opened radially outward. The outer circumferential edge of the basal portion has a substantially circular shape and is recessed to come closer to the rotary axis 45 of the rotator 28 only at the pockets 283. The flange 282 includes suction bores 284 positioned to confront the pockets 283 from the other side along a direction of the rotary axis 45 (i.e., confront from above, and each having a closed peripheral edge). When the rotator 28 is viewed vertically, each of the suction bores 284 is at least partially overlapped with a corresponding one of the pockets 283 and is opened downward toward the pocket 283. The suction bores 284 each have an inner peripheral edge extending along an inner wall surface of the pocket 283 in a planar view. Each of the suction bores 284 vertically penetrates the flange 282.

The pockets 283 and the suction bores 284 are disposed along an outer end of the rotator 28 circumferentially around the rotary axis 45 of the rotator 28, to be spaced apart from each other at predetermined intervals. These pockets 283 and the suction bores 284 obviously rotate integrally with the rotator 28. Each of the molded products P delivered from the conveying device C1 in the module C to the conveying device D1 in the module D is transferred while being engaged with the pocket 283 and the suction bore 284 of the rotator 28 and captured by the suction bore 284.

Figure 13:
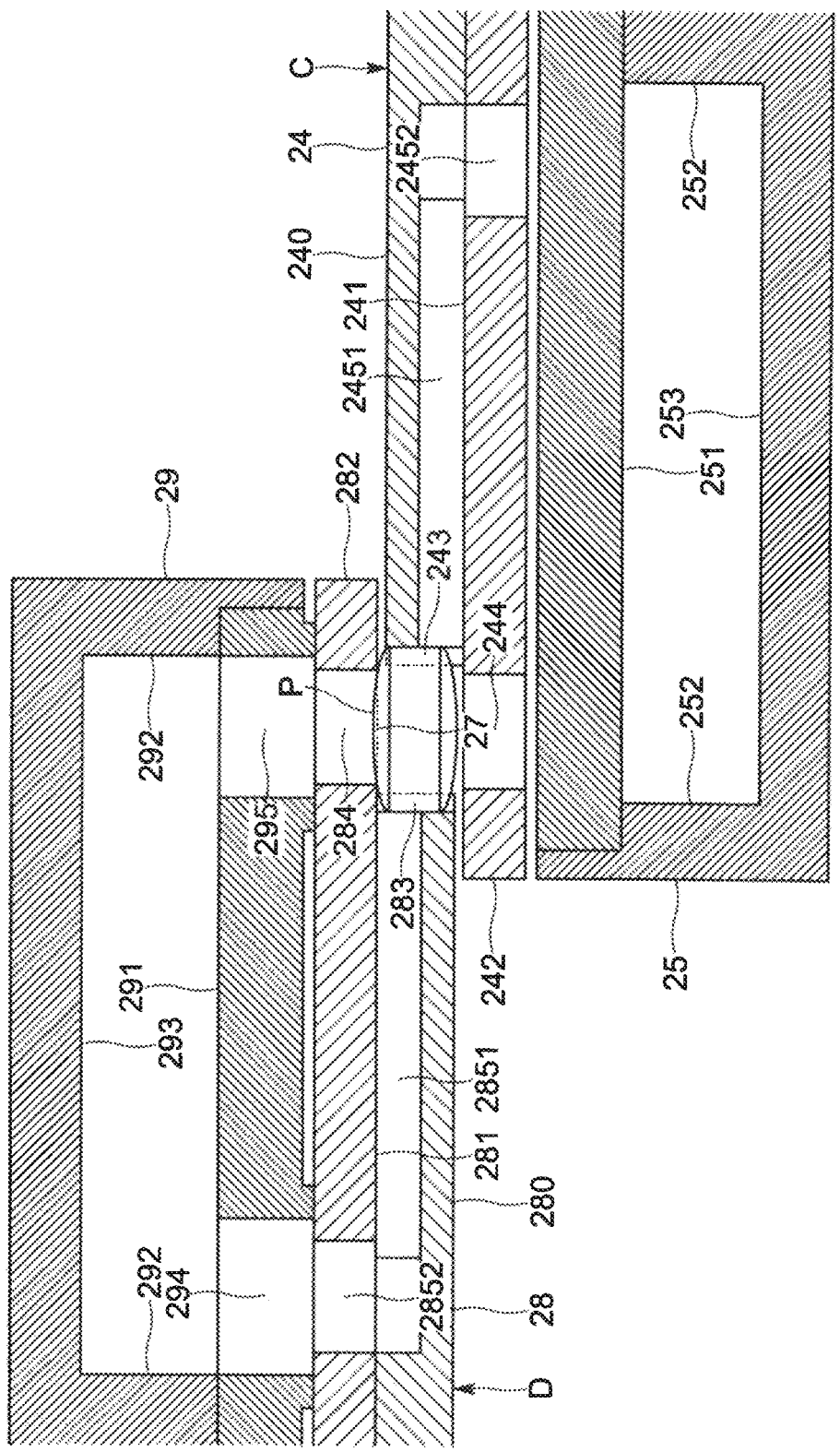
FIG. 13 is another longitudinal sectional view of the main part of the conveying device according to the exemplary embodiment.

As shown exemplarily in FIG. 13, in the outer circumferential portion of the rotator 28 in the conveying device D1, the flange 282 has a lower surface positioned above the upper surface of flange 242 in the outer circumferential portion of the rotator 24 of the conveying device C1 in the module C. The outer circumference and the pockets 283 in the basal portion of the rotator 28 are substantially flush with the basal portion and the pockets 243 of the rotator 24 to horizontally face the basal portion of the rotator 24 and the pockets 243. Furthermore, part of the flange 282 of the rotator 28 overlaps with part of the flange 242 of the rotator 24 from above in a planar view, and both vertically face each other. Synchronous rotation between the rotator 24 and the rotator 28 causes each of the suction bores 244 and a corresponding one of the suction bores 284 to temporarily overlap each other at the delivery position 27. The basal portion of the rotator 24 has an upper surface slightly lower than the lower surface of the flange 282 of the rotator 28, and the upper surface of the flange 242 of the rotator 24 is slightly lower than a lower surface of the basal portion of the rotator 28, to prevent interference between the rotator 24 and the rotator 28.

At the delivery position 27, the molded product P captured by the suction bore 244 of the rotator 24 and being transferred shifts from the flange 242 of the rotator 24 to vertically below the flange 282 of the rotator 28. The molded product P enters the pocket 283 in the rotator 28 and is captured by the suction bore 284. The molded products P are each accommodated in one of the suction bores 284. The suction bores 284 thus engage with the molded products P one-by-one in the order of alignment of the suction bores 244 in the rotator 24 of the conveying device C1 (i.e., keeping the order of compression molding the molded products P by the molding machine A). The molded products P will not be reversed vertically while being delivered from the rotator 24 of the conveying device C1 to the rotator 28 of the conveying device D1.

The molded products P captured by the suction bores 284 are transferred along a rotation locus of the suction bores 284 due to a rotation of the rotator 28. Each of the molded products P accommodated in the suction bore 284 is substantially constantly positioned relatively to the rotator 28 and the suction bore 284. The molded product P receives a centrifugal force due to the rotation of the rotator 28, but is sucked to the suction bore 284 so as not to be displaced outward and drop out of the suction bore 284. Furthermore, the molded products P will not be reversed vertically in the transfer process.

The molded product P captured by the suction bore 284 is eventually transferred to a transfer end position E (i.e., as shown exemplarily in FIG. 12) by the conveying device D1 unless being removed by a removal device D3 to be described later. The molded product P leaves the suction bore 284 of the rotator 28 at the end position F, to be delivered to a device configured to apply a subsequent process to the molded products P or flow downward into a container or the like collecting the molded products P.

Described below is a mechanism configured to suck the molded products P to the pockets 283 and the suction bores 284 of the rotator 28. The pockets 283 and the suction bores 284 each have negative pressure, to suck the molded product P in the pocket 283 and the suction bore 284. As shown exemplarily in FIGS. 12 to 15, the rotator 28 preliminarily includes suction passages 2851 and 2852 configured to feed the pockets 283 with negative pressure. The suction passages 2851 and 2852 include an inner passage 2851 having a start portion opened at an innermost position in the inner wall surface of each of the pockets 283, formed inside the rotator 28, and extending inward toward the rotary axis 45 of the rotator 28, and a suction port 2852 formed by drilling downward from an upper surface of the rotator 28 to an end portion of the inner passage 2851 to allow the inner passage 2851 to communicate with the upper surface of the rotator 28. Specifically, the inner passage 2851 is a groove disposed in the upper surface of the lower circular disc plate 280 as the basal portion of the rotator 28 and opened upward. The groove 2851 is closed from above, by the circular disc plate 281 joined to the upper surface of the circular disc plate 280.

The suction port 2852 is a through hole vertically penetrating a part of the upper circular disc plate 281, positioned vertically above the end portion of the inner passage 2851. The suction passages 2851 and 2852 allow each of the pockets 283 to communicate with the position of the suction port 2852 displaced inward from the pocket 283 in the upper surface of the rotator 28. The numbers of the suction passages 2851 and 2852 are equal to the number of pairs of the pockets 283 and the suction bores 284.

As shown exemplarily in FIG. 13, atmospheres in the inner passages 2851 and the pockets 283 can be sucked via the suction ports 2852 to feed the pockets 283 with negative pressure. The rotator 28 is equipped thereabove with a negative pressure feeding duct 29 that extends along the outer circumference of the rotator 28 in a planar view to have a semi-arc shape. The duct 29 has a tubular body surrounding its internal space with a bottom wall 291 immediately close to the upper surface of the rotator 28, side walls 292 vertically extending upward from an inner side end and an outer side end of the bottom wall 291, and a top wall 293 connecting upper ends of the side walls 292. The internal space of the duct 29 is sucked by a pump (not shown) to have negative pressure.

The bottom wall 291 of the duct 29 includes a slot 294 that is positioned vertically above the suction ports 2852 and has a partial arc shape around the rotary axis 45 of the rotator 28 in a planar view. The slot 294 vertically penetrates the bottom wall 291. The slot extends along a travel locus of the suction ports 2852 according to the rotation of the rotator 28. The slot 294 extends along the rotation of the rotator 28 in a range from a position upstream of the delivery position 27 for the molded products P from the conveying device C1, to a predetermined position downstream of the delivery position 27.

Each of the pockets 283 is fed with negative pressure or is sucked only while the suction port 2852 in the suction passages 2851 and 2852 connected to the pocket 283 is positioned vertically below the slot 294 (i.e., while the internal space having negative pressure in the duct 29 communicates with the pocket 283). When the suction port 2852 is not positioned vertically below the slot 294, the bottom wall 291 is located between the internal space of the duct 29 and the suction port 2852 to isolate the internal space of the duct 29 from the pocket 283 and prevent suction of the pocket 283.

The duct 29 also functions to feed the suction bores 284 with negative pressure. The bottom wall 291 of the duct 29 includes a slot 295 that is positioned vertically above the suction bores 284 and has a partial arc shape around the rotary axis 45 of the rotator 28 in a planar view. The slot 295 also vertically penetrates the bottom wall 291. The slot 295 extends along the travel locus of the suction bores 284 according to the rotation of the rotator 28. The slot 295 extends along the rotation of the rotator 28 in a range from the delivery position 27 for the molded products P from the conveying device C1, to a position just before the conveyance end position E for the molded products P by the conveying device D1.

Each of the suction bores 284 is fed with negative pressure or is sucked only while the suction bore 284 is positioned vertically below the slot 295 (i.e., while the internal space having negative pressure in the duct 29 communicates with the suction bore 284). When the suction bore 284 is not positioned vertically below the slot 295, the bottom wall 291 isolates the internal space of the duct 29 from the suction bore 284 to prevent suction of the suction bore 284.

In a process of delivering the molded product P captured by the pocket 243 and the suction bore 244 of the rotator 24 in the conveying device C1 to a corresponding pair of the pocket 283 and the suction bore 284 of the rotator 28 in the conveying device D1, the pair of the pocket 283 and the suction bore 284 positioned upstream of the delivery position 27 and not retaining the molded product P initially moves toward the delivery position 27. When the pair of the pocket 283 and the suction bore 284 reach a position just before the delivery position 27, the suction port 2852 connected to the pocket 283 via the inner passage 2851 reaches vertically below the slot 294 and the negative pressure feeding duct 29 starts sucking the pocket 283. The suction bore 284 paired with the pocket 283 has not yet reached vertically below the slot 295 at this point, so that the suction bore 284 is not sucked.

In the conveying device C1, the pair of the pocket 243 and the suction bore 244 located upstream of the delivery position 27 and retaining the molded product P moves toward the delivery position 27. When the pair of the pocket 243 and the suction bore 244 subsequently reach the position just before the delivery position 27, the suction bore 244 leaves the position vertically above the slot 255 of the duct 25 to stop suction of the suction bore 244 and cause the molded product P not to be sucked to the suction bore 244. Substantially simultaneously or immediately thereafter, the suction port 2452 connected to the pocket 243 sucking the molded product P via the suction passages 2451 and 2452 leaves the position vertically above the slot 256 to also stop suction of the pocket 243 and cause the molded product P not to be sucked to the pocket 243. The molded product P having reached the delivery position 27 is thus simply mounted on the flange 242 of the rotator 24 in the conveying device C1 and is captured by neither the pocket 243 nor the suction bore 244.

When the pair of the pocket 283 and the suction bore 284 not retaining the molded product P in the conveying device D1 reaches the delivery position 27 for the molded products P, the suction bore 284 reaches vertically below the slot 295 and the negative pressure feeding duct 29 starts sucking the suction bore 284. The suction port 2852 connected to the pocket 283 via the inner passage 2851 is still positioned vertically below the slot 294 at this point, and both the pocket 283 and the suction bore 284 are fed with negative pressure. At the delivery position 27, the molded product P on the flange 242 of the rotator 24 in the conveying device C1 is accordingly sucked inward to come closer to the rotary axis 45 of the rotator 28, toward the pocket 283 of the rotator 28 in the conveying device D1, to shift to below the flange 282 and be engaged with the pocket 283. The molded product P is thus constantly positioned relatively to the suction bore 284. The molded product P is sucked to the pocket 283 as well as to the suction bore 284.

When the rotator 28 rotates and the pair of the pocket 283 and the suction bore 284 sucking the molded product P moves downstream from the delivery position 27 at least a certain distance, the suction port 2852 connected to the pocket 283 via the inner passage 2851 leaves the position vertically below the slot 294 to stop suction of the pocket 283 and cause the molded product P not to be sucked to the pocket 283. In contrast, the suction bore 284 sucking the molded product P is still positioned vertically below the slot 295, to allow the molded product P to be continuously sucked to and captured by the suction bore 284.

When the suction bore 284 sucking the molded product P subsequently reaches the position just before the end position E, the suction bore 284 leaves the position vertically below the slot 295 to stop suction of the suction bore 284 and cause the molded product P not to be sucked to the suction bore 284. Each of the molded products P thus leaves the suction bore 284 of the rotator 28 and falls from the flange 282, to be delivered to a device configured to apply a subsequent process to the molded products P or flow downward into a container or the like collecting the molded products P.

The exterior inspection device D2 configured to inspect the exterior condition of each of the molded products P is disposed in a part of a conveyance section of the molded products P from the delivery position 27 to the end position E in the outer circumferential portion of the rotator 28, as a processing device included in the module D.

Figure 14:
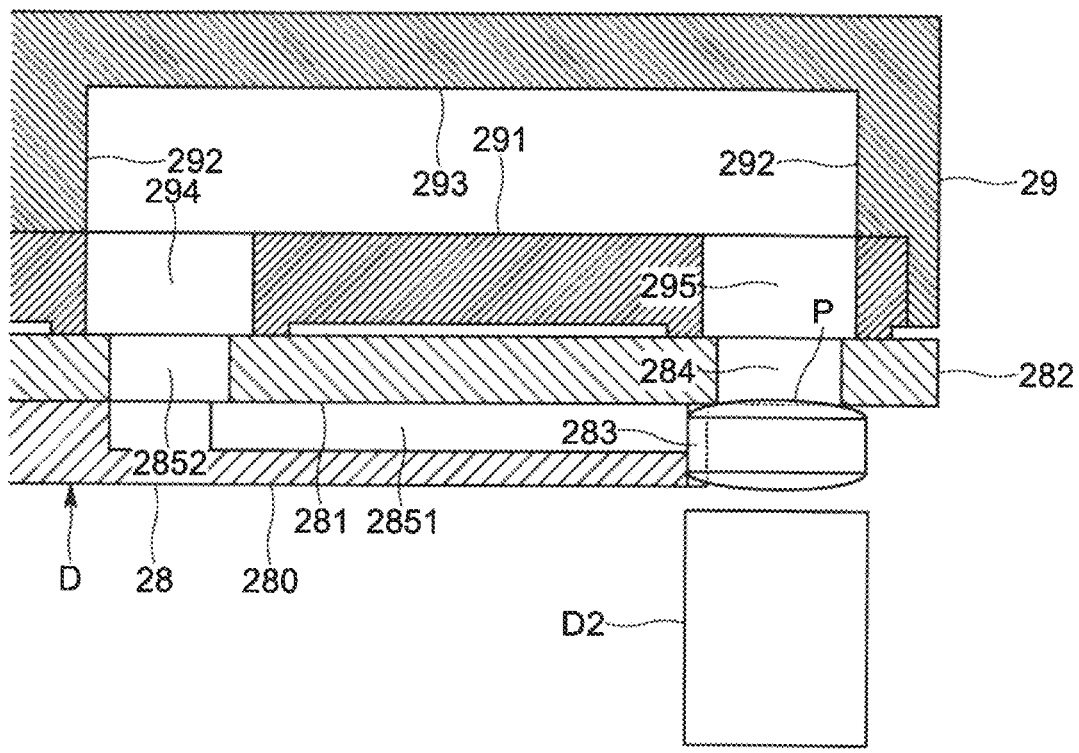
FIG. 14 is still another longitudinal sectional view of the main parts of the conveying device and the processing device according to the exemplary embodiment.

As shown exemplarily in FIG. 14, the exterior inspection device D2 includes a camera configured to image a predetermined surface like the lower surface of each of the molded products P captured by the suction bore 284 and transferred, to obtain a picture thereof. The obtained picture can be used for inspection of the exterior condition of the molded product P. Specifically, the obtained picture can be analyzed, be compared with a picture of a normal molded product P, or the like, to enable determination of whether the exterior of the molded product P is in a normal or a defective condition.

The camera in the exterior inspection device D2 can be configured to image the lower surface of the molded product P as well as the upper surface of the molded product P. Pictures of the upper surface and the lower surface of the molded product P can be analyzed to obtain a width, a length, a diameter, and an area, and the like of the molded product P. A side surface of the molded product P can optionally be imaged for determination of whether the molded product P is in a normal or a defective condition. The picture of the side surface of the molded product P can be analyzed to obtain a height (i.e., thickness) of the molded product P. The exterior inspection device D2, functioning as a three-dimensional measurement device adopting an optical cutting method, is configured to obtain three-dimensional data on the molded product P, and the obtained data can be analyzed for determination of whether the exterior of the molded product P is in a normal or a defective condition. The exterior inspection device D2 can be configured to execute either one of these processes or can be configured to execute some of the processes in combination.

In a planar view in the vertical direction, the peripheral edge of the suction bore 284 is entirely closed continuously and is sized and shaped to be located inside the outer edge of the molded product P sucked to the suction bore 284. When the suction bore 284 capturing the molded product P passes through the area of the exterior inspection device D2, the molded product P tightly adheres to the suction bore 284 with no gap (or substantially no gap) between the peripheral edge of the suction bore 284 and the outer edge of the molded product P due to negative pressure fed from the duct 29 into the suction bore 284. The molded product P sucked to the suction bore 284 and retained is conveyed in the rotation direction of the rotator 28, while being constantly positioned relatively to the rotator 28 and the suction bore 284, This is effectual for processing of imaging the molded product P with use of a camera for exterior inspection, and the like.

The die table 31 of the molding machine A, the rotator 17 of the discharge device B1 in the module B, the rotator 24 of the conveying device C1 in the module C, and the rotator 28 of the conveying device in the module D rotate in synchronization with one another. The controller of the molding machine A and the processing system S refers to a signal outputted from the angular position sensor (e.g., a rotary encoder) accompanying the turret 3 of the molding machine A, the rotator 17 of the discharge device B1, the rotator 24 of the conveying device C1, or the rotator 28 of the conveying device D1, to find current positions of the suction bores 284 aligned circumferentially around the rotary axis 45 of the rotator 28.

Furthermore, it is possible to find a current position in the module D, of the molded product P compression molded in the die bore 4 having a certain order number in the die table 31 of the molding machine A. This indicates that the molded product P having just passed in front of the camera of the exterior inspection device D2 (i.e., having gone through exterior inspection), is molded in the die bore 4 having a certain order number. The controller stores to hold in the storage device, information on a result of an exterior inspection of the molded product P (i.e., a result of determination of whether the exterior of the target molded product P is in a normal or a defective condition, or the like) with use of the exterior inspection device D2, in association with an ID number indicating a certain order number of the die bore 4 used for molding the target molded product P.

The molded product P captured by the suction bore 284 of the rotator 28 in the conveying device D1 is ordinarily transferred to the transfer end position E. There is, however, a demand for removal or collection of a specific one of the molded products P, such as a defective product or a sampled product by selecting from among the molded products P to be transferred to the end position E.

Figure 15:
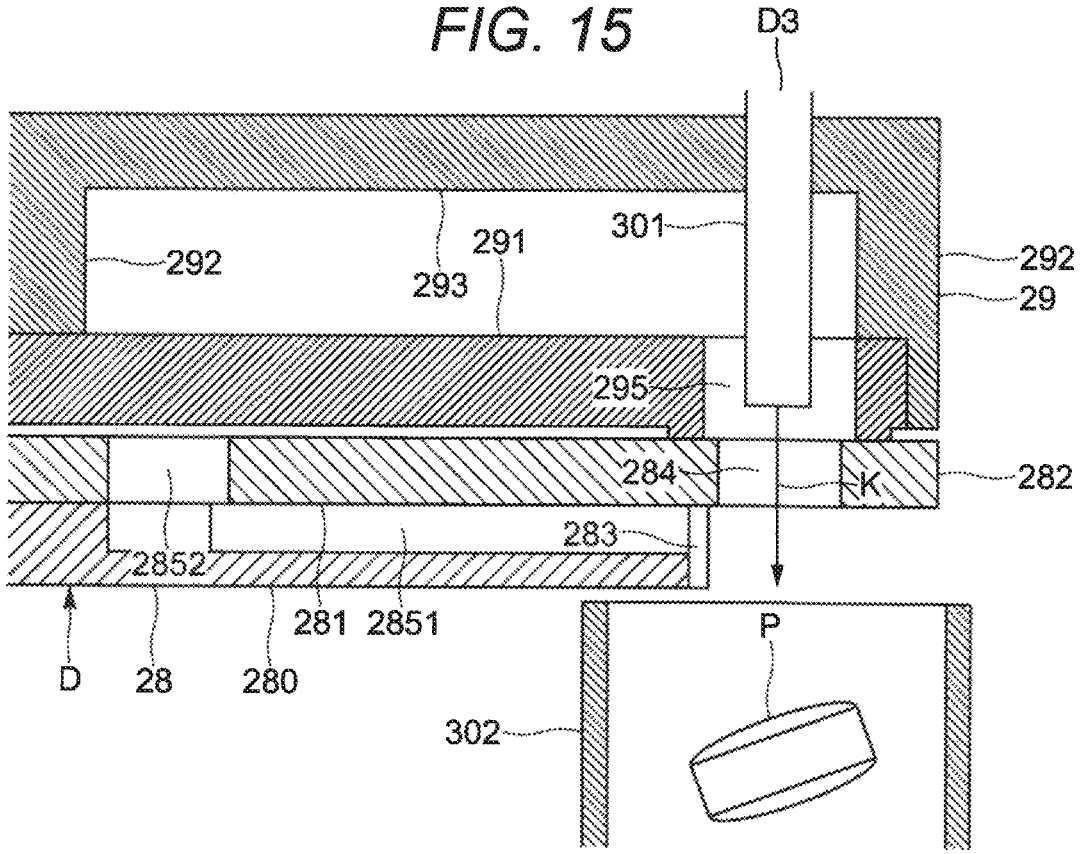
FIG. 15 is a longitudinal sectional view of main parts of the conveying device and a removal device according to the exemplary embodiment.

As shown exemplarily in FIGS. 12 and 15, the removal device D3 configured to remove a specific one of the molded products P is preferably disposed halfway on the rotation locus of the suction bores 284 and the molded products P to the end position E in the conveying device D1 in the module D. The removal device D3 includes, as constituent elements, a spray nozzle 301 configured to spray the compressed air K toward the molded product P engaged with the suction bore 284, and a chute 302 configured to receive the molded product P falling by being blown off by the compressed air K. The spray nozzle 301 and the chute 302 are disposed to vertically face each other and sandwich the suction bore 284 sucking the molded product P. The spray nozzle 301 sprays the compressed air K to remove the molded product P retained by the suction bore 284, and the chute 302 receives to collect the molded product P detached from the flange 282 of the rotator 28. The compressed air K can have a small injection quantity (i.e., a flow rate per unit time) and a small injection pressure. The spray nozzle 301 has a relative position to the rotator 28 and a direction of spraying the compressed air K, which are set appropriately to allow the molded product P to be detached from the flange 282.

The controller of the molding machine A and the processing system S identifies that the die bore 4 having a certain order number in the molding machine A is used for molding the molded product P engaged with each of the suction bores 284 in the rotator 28. The controller stores, for each of the molded products P, information on results of various inspection(s) of the molded product P, namely, whether compression pressure for compression molding is normal or defective, whether or not the molded product P contains any foreign matter, whether or not the molded product P has defective quality, whether the exterior of the molded product P is normal or defective, and the like, in association with an ID number indicating a certain order number of the die bore 4 used for molding the molded product P in the molding machine A. The controller accordingly recognizes whether the molded product P engaged with each of the suction bores 284 of the rotator 28 is normal or defective, and can find a current position of the suction bore 284 engaged with a defective molded product P.

The controller transmits a control signal for opening a valve configured to control the flow of the compressed air K (e.g., possibly incorporated in the spray nozzle 301) when the suction bore 284 capturing the defective molded product P passes near the spray nozzle 301, to cause the spray nozzle 301 to spray the compressed air K toward the defective molded product P to drop and remove the molded product P from the rotator 28. The molded product P falling into the chute 302 cannot reach the end position E.

The molded product P sucked to the suction bore 284 is conveyed in the rotation direction of the rotator 28, while being constantly positioned relatively to the rotator 28 and the suction bore 284. This is effectual also for processing of spraying the compressed air K toward the molded product P engaged with a specific one of the suction bores 284 to remove or extract the molded product P.

According to the exemplary embodiment, the rotary axis 43 of the rotator 17 in the discharge device B1, the rotary axis 44 of the rotator 24 in the conveying device C1, and the rotary axis 45 of the rotator 28 in the conveying device D1 are connected to each other via the gear transmission mechanisms 41 and 42, so as to rotate in synchronization with one another. There is provided a single motor 400 (e.g., as shown exemplarily in FIG. 19) configured to drive to rotate the rotators 17, 24, and 28, and the motor 400 is directly connected to the rotary axis 43 of the rotator 17 in the discharge device B1. Drive power outputted from the motor 400 rotates the rotator 17 in the discharge device B1, and is also transmitted to the rotary axes 44 and 45 of the rotators 24 and 28 in the conveying devices C1 and D1 via the gear transmission mechanisms 41 and 42 to rotate the rotators 24 and 28.

The modules C and D, configured to transfer the molded products P, optically inspect each of the molded products P. The exterior inspection devices C3 and D2 in the modules C and D each include a camera sensor configured to receive illumination light or the electromagnetic wave L emitted from the illumination light source and reflected at an outer layer of the molded product P captured by the suction bore 244 or 284 of the rotator 24 or 28. In contrast, the foreign matter inspection device or the quality inspection device C2 in the module C includes the sensor 262 configured to receive transmitted light or the electromagnetic wave L emitted from the light source 261 and transmitted through the molded product P captured by the suction bore 244 of the rotator 24. Accuracy improvement in inspection by the inspection devices C2, C3, and D2 needs inhibiting light other than the reflected light L or the transmitted light L of the molded product P, particularly diffusely reflected light at the rotator 24 or 28, from being incident on the sensors 262 in the inspection devices C2, C3, and D2.

Figure 23:
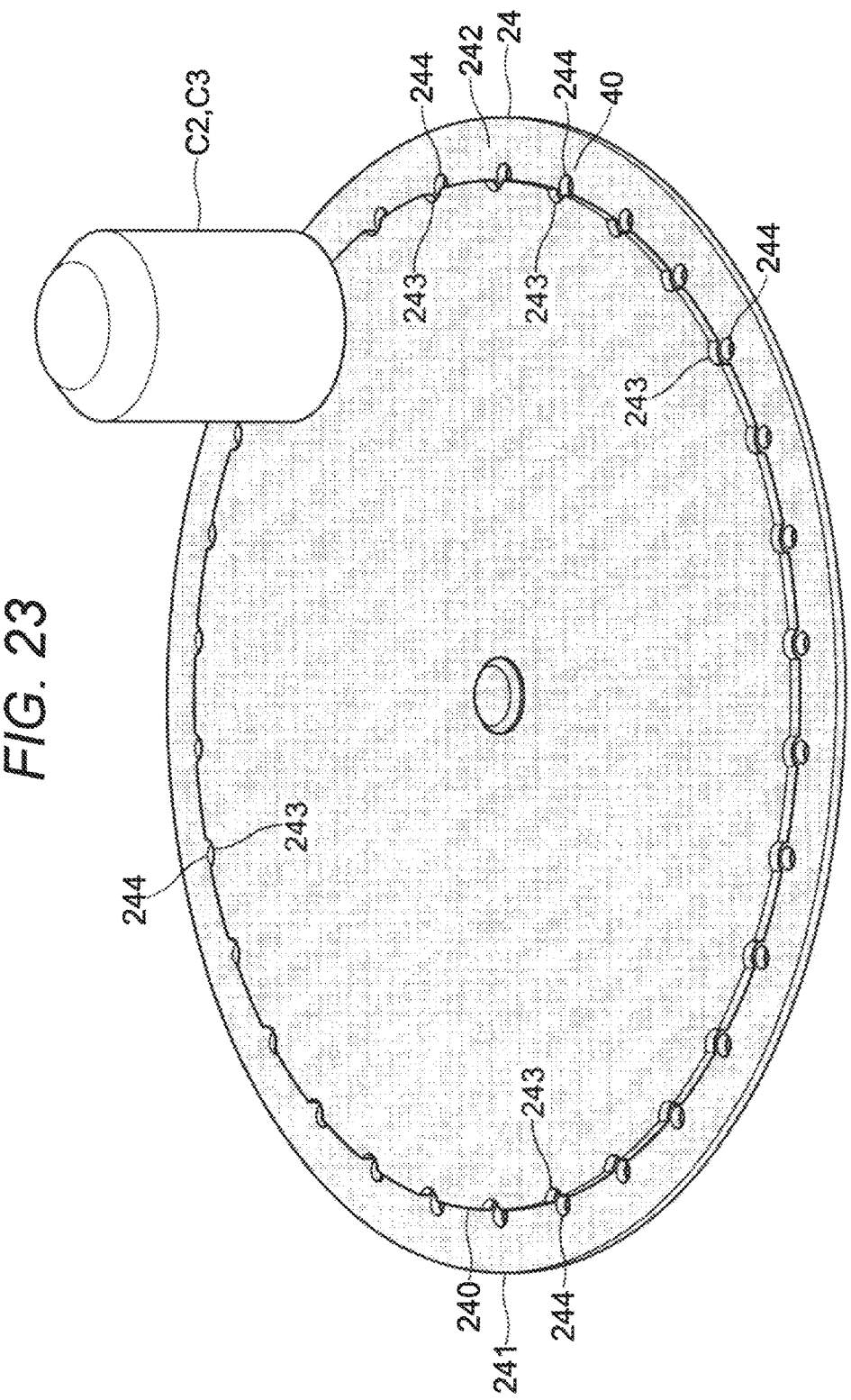
FIG. 23 is a perspective view from above, of a transfer body of the conveying device and the inspection device according to the exemplary embodiment.
Figure 24:
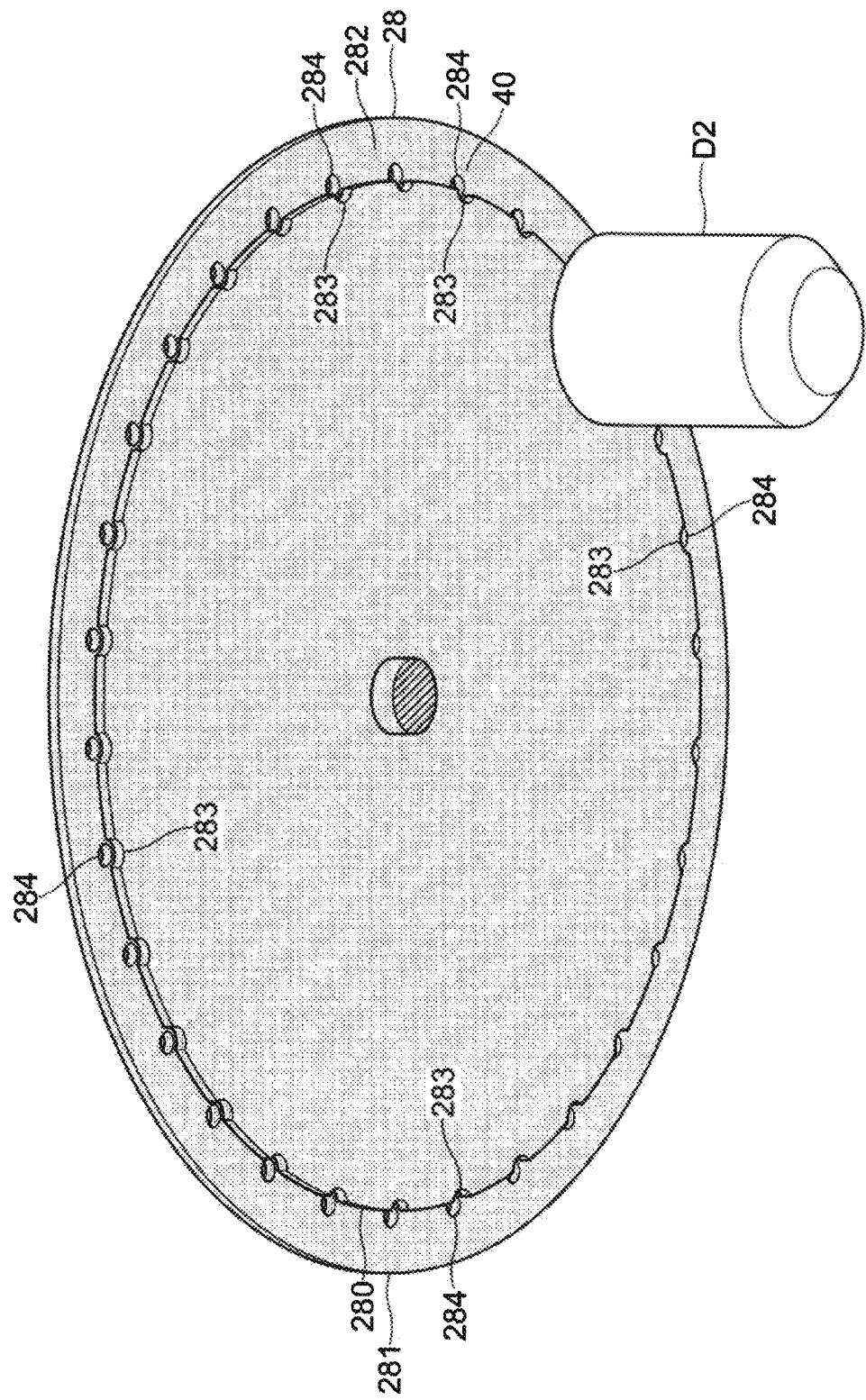
FIG. 24 is a perspective view from below, of the transfer body of the conveying device and the inspection device according to the exemplary embodiment.

In view of this, the exemplary embodiment provides an antireflection layer 40 (e.g., as shown exemplarily in FIGS. 23 and 24) inhibiting reflection of light or an electromagnetic wave, on at least surfaces of portions around the suction bores 244 and 284 (e.g., particularly, inner circumferential surfaces of the suction bores 244 and 284, upper and lower surfaces of the circular disc plates 241 and 281 continuing to open edges thereof, inner circumferential surfaces of the pockets 243 and 283 confronting the suction bores 244 and 284, the upper surface of the circular disc plate 240 positioned around the pockets 243, and the lower surface of the circular disc plate 280 positioned around the pockets 283) of the rotators 24 and 28 as constituent elements of the conveying devices C1 and D1 in the modules C and D.

The antireflection layer 40 is exemplarily formed by applying known paint or dye exerting an antireflection effect of absorbing light or an electromagnetic wave to reduce reflection thereof, onto surfaces of the circular disc plates 240, 241, 280, and 281 (or coating the circular disc plates 240, 241, 280, and 281 with an antireflection agent) constituting the rotators 24 and 28. Applying in this case includes partially or entirely immersing the circular disc plates 240, 241, 280, and 281 in a solution of antireflection paint or dye. As shown exemplarily in FIGS. 23 and 24, it is also preferred to form the antireflection layer 40 substantially entirely on the rotators 24 and 28 by applying the antireflection paint or dye onto substantially entirety of the circular disc plates 240, 241, 280, and 281.

In a case where the circular disc plates 240, 241, 280, and 281 are made of aluminum or an aluminum alloy, forming the antireflection layer 40 on surfaces thereof may correspond to black colored alumite treatment. As being well-known, alumite treatment includes anodizing a surface of aluminum or an aluminum alloy to generate an oxide film having many micropores. When antireflection paint or dye is applied onto the film, a coloring agent (e.g., coloring matter, pigment, or dye) having an antireflection effect enters to adhere to the surface of the film, as well as to the insides of the micropores. Such alumite coloring may keep the micropores of the film open only through application of paint or dye. It is thus preferred to additionally execute a sealing processing to close the pores.

Applying antireflection paint or dye can obviously be replaced by pasting a known antireflection film or sheet on the surfaces of the circular disc plates 240, 241, 280, and 281 to form the antireflection layer 40. Antireflection paint, antireflection dye, and an antireflection film or sheet are typically black, so that the rotators 24 and 28 having the antireflection layer 40 have outer surfaces in black (or a color similar to black). In addition, the antireflection layer 40 has a surface in a so-called "matte state" of having no glossiness due to inhibited mirror reflection of light or an electromagnetic wave.

In comparison to the surfaces (of the circular disc plates 240, 241, 280, and 281) of the rotators 24 and 28 having no antireflection layer 40, the antireflection layer 40 reduces a reflectance of light in a wavelength range including the illumination light L emitted from the illumination light source of the exterior inspection devices C3 and D2, and reduces a reflectance of light in a wavelength range including the light L emitted from the light source 261 of the foreign matter inspection device or the quality inspection device C2. In short, the antireflection layer 40 decreases a reflectance of visible light and/or infrared light. The antireflection layer 40 also absorbs ambient light other than the light L emitted from the light source 261 of the inspection device C2, C3, or D2 to inhibit reflection thereof.

Figure 17:
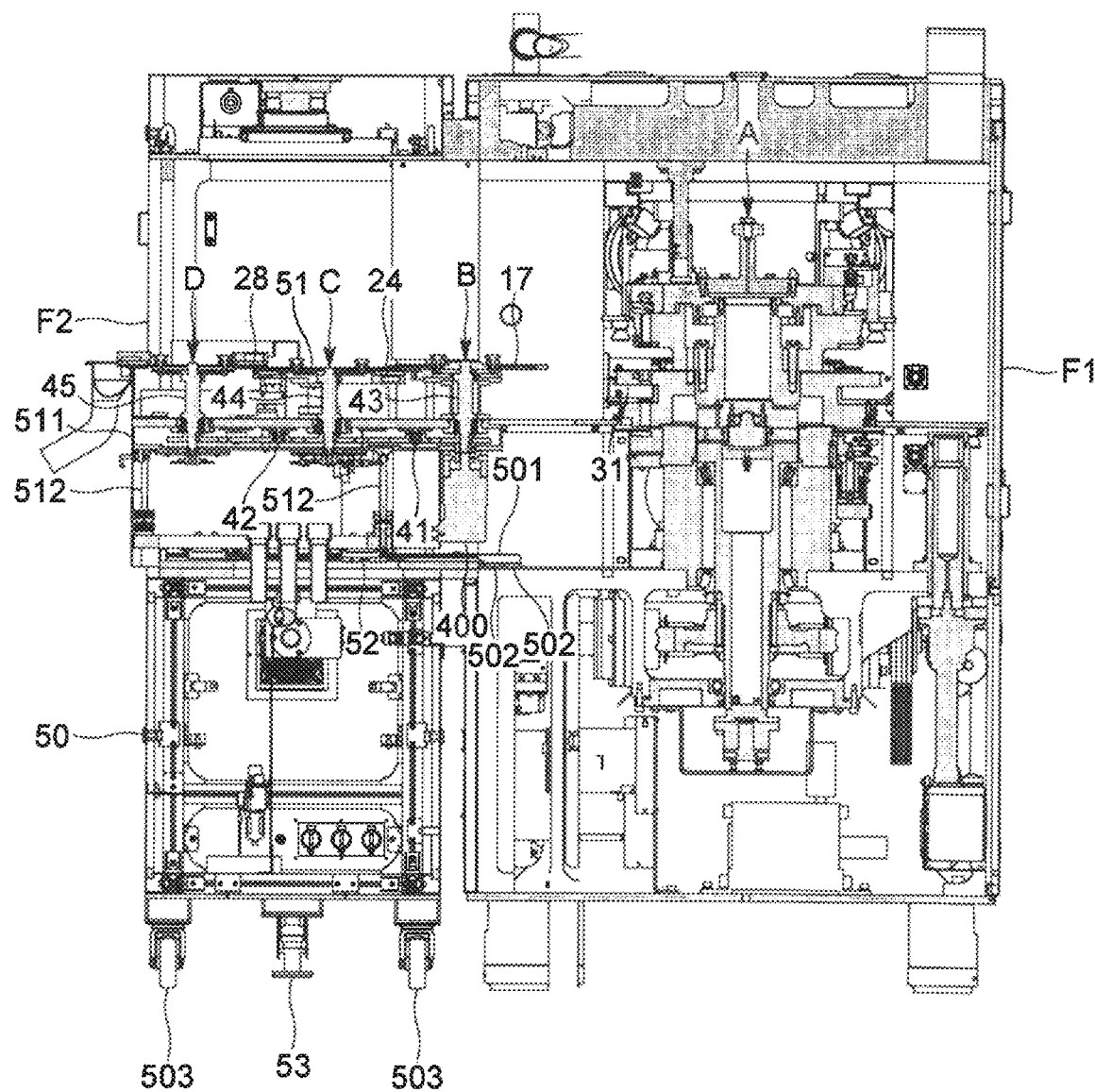
FIG. 17 is a longitudinal sectional view of the compression-molding machine, the discharge device, and the conveying device according to the exemplary embodiment.
Figure 19:
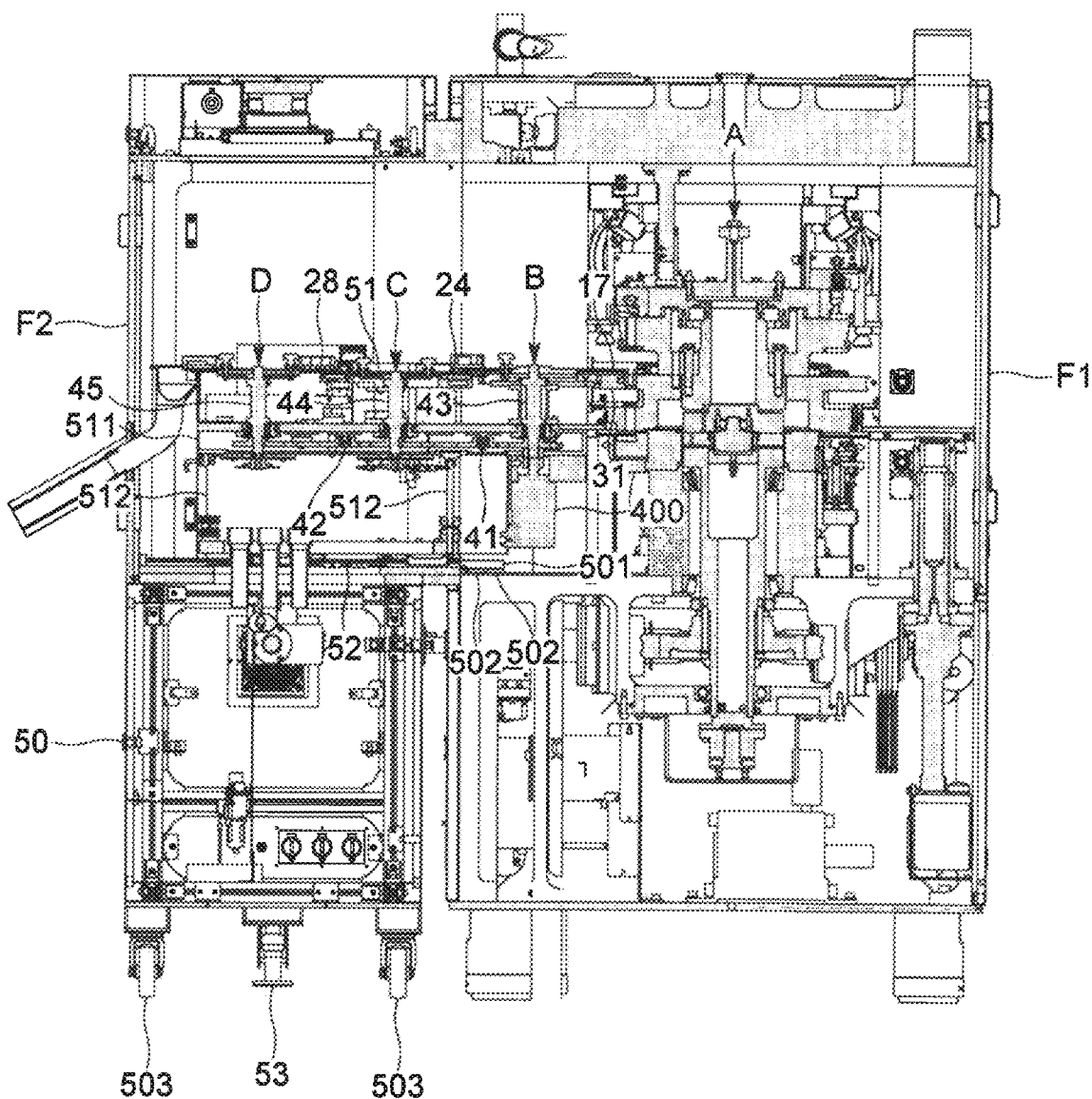

The discharge device B1 including the rotator 17 and the retainer 18, the conveying devices C1 and D1 including the rotators 24 and 28 and the suction ducts 25 and 29, the motor 400 functioning as a drive source of the discharge device B1 and the conveying devices C1 and D1, the dust removal device B2, the foreign matter inspection device or the quality inspection device C2, the exterior inspection devices C3 and D2, and the removal device D3 are supported by a single support body 511 and constitute a single unit 51, as shown exemplarily in FIGS. 17 and 19. The unit 51 is supported by a base 50 via a slide rail mechanism 52. The base 50 has a bottom having casters 503 configured to be in contact with a floor surface and roll, so that the unit 51 as well as the base 50 can move easily. In short, the modules B, C, and D are integrated via the unit 51 and the base 50 so as to be integrally attached to and detached from the molding machine A.

Figure 18:
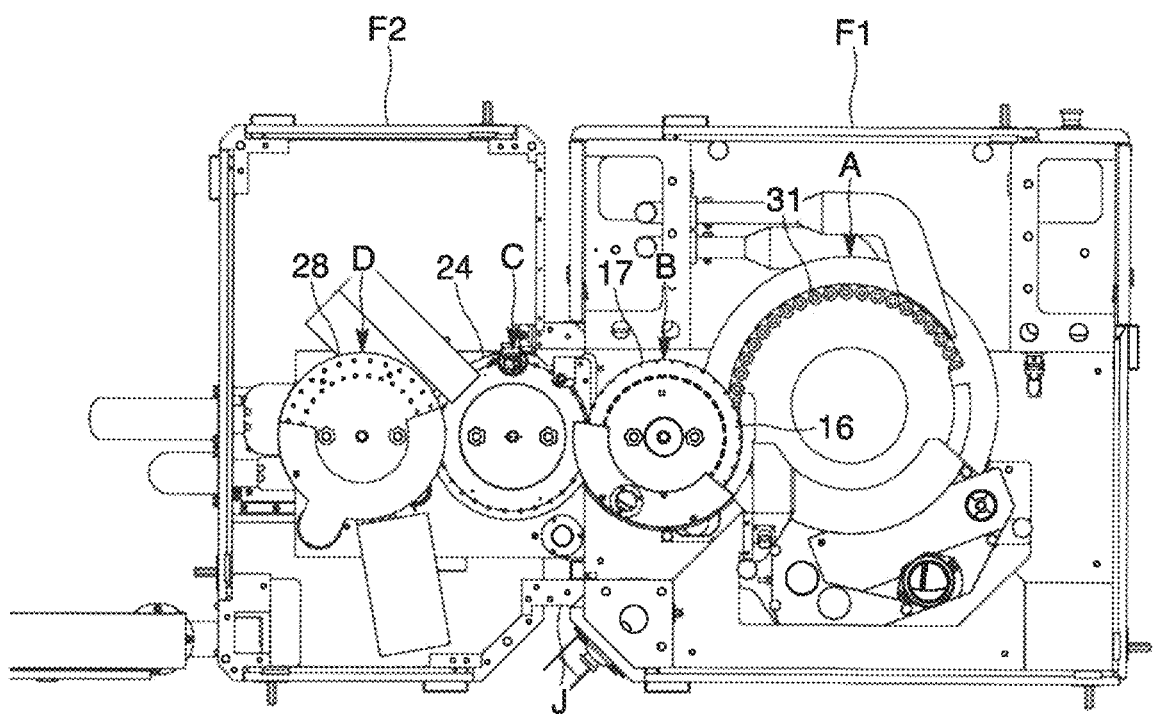
FIG. 18 is another plan view of the compression-molding machine, the discharge device, and the conveying device according to the exemplary embodiment.

As shown exemplarily in FIG. 18, the molding machine A is accommodated in a containment case F1. The modules B, C, and D in the processing system S are also accommodated in a containment case F2. The containment case F1 for the molding machine A and the containment case F2 for the modules B, C, and D are connected via a joint J. The joint J is configured to allow communication between an internal space of the containment case F1 accommodating the molding machine A and an internal space of the containment case F2 accommodating the modules B, C, and D, and appropriately attach and detach the former containment case F1 to and from the latter containment case F2. The joint J accommodates the molded product discharge position 16, where the die table 31 of the molding machine A and the rotator 17 of the discharge mechanism B1 overlap with each other in a planar view, as well as a peripheral area of the molded product discharge position.

The containment cases F1 and F2 and the joint J inhibit unintended leakage of atmospheres in the internal spaces around the molding machine A and the modules B, C; and D to outside the containment cases F1 and F2. Molding of the molded products P, delivery of the molded products P between the molding machine A and the module B as well as between the modules B, C, and D, and application of post processes to the molded products P such as removal of dust adhering to the molded products P and inspection of the molded products P, are each executed generally in the containment cases F1 and F2. Execution of such post processes does not require the molded products P to be discharged out of the system. It is thus possible to achieve a containment environment preventing atmospheres containing the powdery material from leaking outside, which is useful in production of the molded products P particularly containing a highly pharmacologically active substance. It is also possible to inhibit contamination of the molded products P.

Figure 16:
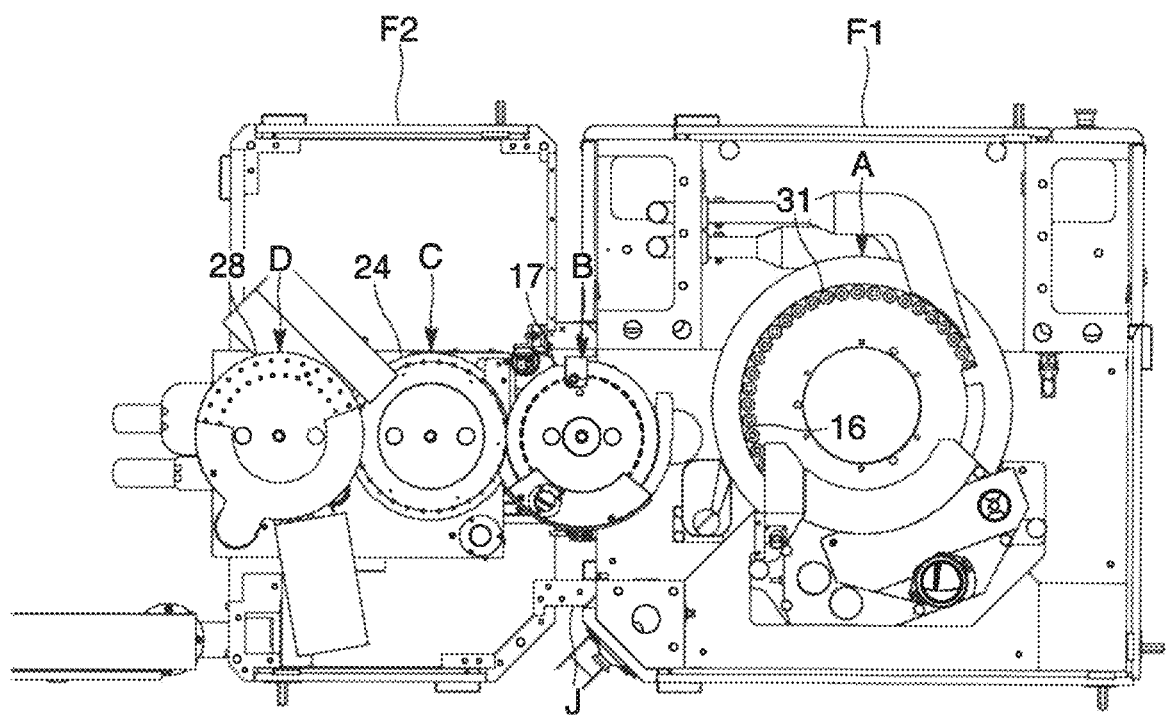
FIG. 16 is a plan view of the compression-molding machine, the discharge device, and the conveying device according to the exemplary embodiment.

As shown exemplarily in FIG. 16, when the unit 51 is displaced to a retreat position upon maintenance or the like of the module B, C, or D, at least part of the module can be extracted from the containment case F2.

As described above, the exterior inspection device C3 as the inspection device according to the exemplary embodiment determines whether or not there is foreign matter in the image of the first inspection region R1 as well as in the image of the second inspection region R2, to enable detection of foreign matter projecting from the side surface of the molded product P particularly based on the image of the second inspection region R2.

Furthermore, a second foreign matter determiner C33 determines that there is foreign matter if a portion in a color different from black as the color of the background occupies at least a predetermined ratio in the second inspection region R2, so that presence of the foreign matter can be determined without use of any other sensor or the like.

Moreover, the exemplary embodiment provides the molded product conveying modules C and D including the rotators 24 and 28 serving as transfer bodies having the suction bores 244 and 284 serving as capturing portions configured to capture the molded products P and configured to transfer the molded products P by motion of displacing the suction bores 244 and 284, the optical sensors (the camera C30 of the exterior inspection device C3, the camera sensor of the exterior inspection device D2, and the sensor 262 of the foreign matter inspection device or the quality inspection device C2) disposed near the travel locus of the molded products P captured by the capturing portions 244 and 284 of the rotators 24 and 28 and transferred, and configured to receive the light or the electromagnetic wave L reflected at the outer layers of the molded products P or the light or the electromagnetic wave L transmitted through the molded products P, and the antireflection layer 40 disposed on at least the surfaces of the portions around the capturing portions 244 and 284 of the rotators 24 and 28 and inhibiting reflection of light or an electromagnetic wave.

The exemplary embodiment enables inhibiting, in the modules C and D configured to optically inspect the molded products P while conveying the molded products P, light other than the reflected light L or the transmitted light L of the molded products P from being incident on the sensor 262 of the inspection device C2, C3, or D2, This achieves further accuracy improvement in inspection of the molded products P with use of the inspection devices C2, C3, and D2.

Particularly in the exemplary embodiment, the outer surfaces of the rotators 24 and 28 having the antireflection layer 40 constitute the background of the image obtained by the camera C30 or the camera sensor and the outer surfaces have black (or a color similar to black), to facilitate detection of the foreign matter P2 in a bright color such as white.

Note that the exemplary invention is not limited to the exemplary embodiment described above.

For example, the exemplary embodiment described above provides the camera and the light source disposed on the identical side with respect to the molded product P, and the background in black (or a color similar to black), in order to facilitate detection of foreign matter in a bright color. The camera and the light source may alternatively be disposed on opposite sides with respect to the molded product in order to facilitate detection of foreign matter in a dark color such as black. More specifically, the exemplary invention may be applied to the exterior inspection device D2 as one of the inspection devices according to the exemplary embodiment described above. Furthermore, the background may alternatively have white or a color similar to white.

Moreover, the molded-product processing system may include a plurality of inspection devices according to the exemplary invention. In this case, the system may exemplarily include an inspection device including a camera and a light source disposed on an identical side and having a background in black or a color similar to black, and an inspection device including a camera and a light source disposed on opposite sides and having a background in white or a color similar to white, to enable detection of foreign matter in a bright color such as white and foreign matter in a dark color such as black.

Furthermore, the inspection device according to the exemplary invention may be applied, not limitedly to a system including the rotary compression-molding machine, but to any system including an apparatus configured to manufacture molded products having a predetermined shape.

The molded products are not limited in shape to the circular shape, but may have any one of various shapes including an elliptical shape and a polygonal shape.

Other than the above, the exemplary invention may be modified in various manners as long as not affecting the purpose of the exemplary invention.

The descriptions of the various exemplary embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. An inspection device for a molded product configured to inspect whether or not the molded product molded into a predetermined shape has defectiveness based on a captured image of the molded product, the inspection device comprising:
   a first foreign matter determiner configured to determine whether or not, in an obtained image of the molded product, a first inspection region located inside an outline of an assumed normal molded product includes foreign matter to inspect for defectiveness of the molded product; and
   a second foreign matter determiner configured to determine whether or not, in the obtained image of the molded product, a second inspection region located outside the outline of the assumed normal molded product includes foreign matter to inspect for defectiveness of the molded product.

2. The inspection device according to claim 1, wherein the second foreign matter determiner determines that the foreign matter exists if a portion in a color different from a color of a background occupies at least a predetermined ratio in the second inspection region.

3. The inspection device according to claim 2, wherein the inspection device comprises a camera configured to obtain an image of the molded product and a light source disposed on a side where the camera is disposed with respect to the molded product, and the background of the second inspection region has black or a color similar to black.

4. The inspection device according to claim 2, wherein the inspection device comprises a camera configured to obtain an image of the molded product and a light source disposed on a side opposite to a side where the camera is disposed with respect to the molded product.

5. The inspection device according to claim 2, wherein the background of the second inspection region has white or a color similar to white.

6. The inspection device according to claim 4, wherein the background of the second inspection region has white or a color similar to white.

7. A molded-product processing system connected to a compression-molding machine configured to compress a powdery material to mold the powdery material into the predetermined shape and including the inspection device according to claim 1, the inspection device being configured to inspect molded products obtained by the compression-molding machine.

8. A molded-product processing system connected to a compression-molding machine configured to compress a powdery material to mold the powdery material into the predetermined shape and including the inspection device according to claim 2, the inspection device being configured to inspect molded products obtained by the compression-molding machine.

9. A molded-product processing system connected to a compression-molding machine configured to compress a powdery material to mold the powdery material into the predetermined shape and including an inspection device 3, the inspection device being configured to inspect molded products obtained by the compression-molding machine,
   the inspection device for a molded product configured to inspect whether or not the molded product molded into a predetermined shape has defectiveness based on a captured image of the molded product, the inspection device comprising:
      a first foreign matter determiner configured to determine whether or not, in an obtained image of the molded product, a first inspection region located inside an outline of an assumed normal molded product includes foreign matter; and
      a second foreign matter determiner configured to determine whether or not, in the obtained image of the molded product, a second inspection region located outside the outline of the assumed normal molded product includes foreign matter,
   wherein the second foreign matter determiner determines that the foreign matter exists if a portion in a color different from a color of a background occupies at least a predetermined ratio in the second inspection region,
   wherein the inspection device comprises a camera configured to obtain an image of the molded product and a light source disposed on a side where the camera is disposed with respect to the molded product, and the background of the second inspection region has black or a color similar to black.

10. A molded-product processing system connected to a compression-molding machine configured to compress a powdery material to mold the powdery material into the predetermined shape and including the inspection device according to claim 4, the inspection device being configured to inspect molded products obtained by the compression-molding machine.

11. A molded-product processing system connected to a compression-molding machine configured to compress a powdery material to mold the powdery material into the predetermined shape and including the inspection device according to claim 5, the inspection device being configured to inspect molded products obtained by the compression-molding machine.

12. A molded-product processing system connected to a compression-molding machine configured to compress a powdery material to mold the powdery material into the predetermined shape and including the inspection device according to claim 6, the inspection device being configured to inspect molded products obtained by the compression-molding machine.

13. The molded-product processing system according to claim 7, the molded- product processing system comprising a module that is coupled to the compression-molding machine, is configured to convey the molded products being kept aligned in an order of molding by the compression-molding machine, and includes the inspection device.

14. The molded-product processing system according to claim 8, the molded-machine, product processing system comprising a module that is coupled to the compression-molding is configured to convey the molded products being kept aligned in an order of molding by the compression-molding machine, and includes the inspection device.

15. The molded-product processing system according to claim 9, the molded-machine, product processing system comprising a module that is coupled to the compression-molding is configured to convey the molded products being kept aligned in an order of molding by the compression-molding machine, and includes the inspection device.

16. The molded-product processing system according to claim 10, the molded-machine, product processing system comprising a module that is coupled to the compression-molding is configured to convey the molded products being kept aligned in an order of molding by the compression-molding machine, and includes the inspection device.

17. The molded-product processing system according to claim 11, the molded-machine, product processing system comprising a module that is coupled to the compression-molding is configured to convey the molded products being kept aligned in an order of molding by the compression-molding machine, and includes the inspection device.

18. The molded-product processing system according to claim 12, the molded-machine, product processing system comprising a module that is coupled to the compression-molding is configured to convey the molded products being kept aligned in an order of molding by the compression-molding machine, and includes the inspection device.

19. A method, for an inspection device, of inspecting whether or not a molded product molded into a predetermined shape has defectiveness based on a captured image of the molded product, the method comprising:
   determining whether or not, in an obtained image of the molded product, a first inspection region located inside an outline of an assumed normal molded product includes foreign matter to inspect for defectiveness of the molded product; and
   secondly determining whether or not, in the obtained image of the molded product, a second inspection region located outside the outline of the assumed normal molded product includes foreign matter to inspect for defectiveness of the molded product.

20. A non-transitory computer readable medium comprising the method according to claim 19 executable by a processor, wherein the secondly determining determines that the foreign matter exists if a portion in a color different from a color of a background occupies at least a predetermined ratio in the second inspection region.

* * * * *